(12) United States Patent
Ohmiya et al.

(10) Patent No.: US 9,928,014 B2
(45) Date of Patent: Mar. 27, 2018

(54) PRINTER

(71) Applicant: BROTHER KOGYO KABUSHIKI KAISHA, Nagoya-shi, Aichi-ken (JP)

(72) Inventors: Takashi Ohmiya, Nagoya (JP); Takashi Sugiyama, Okazaki (JP)

(73) Assignee: BROTHER KOGYO KABUSHIKI KAISHA, Nagoya-Shi, Aichi-Ken (JP)

( * ) Notice: Subject to any disclaimer, the term of this patent is extended or adjusted under 35 U.S.C. 154(b) by 0 days.

(21) Appl. No.: 14/484,768

(22) Filed: Sep. 12, 2014

(65) Prior Publication Data

US 2015/0077779 A1 Mar. 19, 2015

(30) Foreign Application Priority Data

Sep. 13, 2013 (JP) .................................. 2013-190801

(51) Int. Cl.
  *G06F 15/00* (2006.01)
  *G06F 3/12* (2006.01)
  *G06K 15/00* (2006.01)

(52) U.S. Cl.
  CPC .......... *G06F 3/1238* (2013.01); *G06F 3/1222* (2013.01); *G06F 3/1267* (2013.01); *G06F 3/1288* (2013.01); *G06K 15/4095* (2013.01)

(58) Field of Classification Search
  CPC ...... G06F 3/1222; G06F 3/1238; G06F 3/126; G06F 3/1297; G06K 15/4095
  USPC ....................................................... 358/1.13
  See application file for complete search history.

(56) References Cited

U.S. PATENT DOCUMENTS

| | | | |
|---|---|---|---|
| 6,058,249 A | 5/2000 | Matsuda et al. | |
| 2005/0100378 A1* | 5/2005 | Kimura et al. | ................. 400/76 |
| 2005/0243363 A1* | 11/2005 | Muto | ........................... 358/1.15 |
| 2006/0256364 A1 | 11/2006 | Yamamoto | |
| 2008/0180731 A1 | 7/2008 | Tomita | |

(Continued)

FOREIGN PATENT DOCUMENTS

| | | |
|---|---|---|
| JP | 2005-245000 A | 9/2005 |
| JP | 2005-254736 A | 9/2005 |
| JP | 2006-191473 A | 7/2006 |

(Continued)

OTHER PUBLICATIONS

Office Action from corresponding Japanese Patent Application No. 2013-190801, dated Jan. 10, 2017.

(Continued)

*Primary Examiner* — Mark Milia
(74) *Attorney, Agent, or Firm* — Merchant & Gould P.C.

(57) ABSTRACT

A printer includes a memory storing instructions for authenticating a login user and determining whether a user identity information is included in a print data. When the user identity information is included in the print data, the instructions cause the printer to determine whether the login user is identical with a data sender user having sent the print data. When the login user is identical with the data sender user, the instructions cause the printer to print the pint data. When the login user is not identical with the data sender user, the instructions cause the printing portion to not print the print data. When the user identity information is not included in the print data, the instructions cause the printer to print the print data irrespective of whether the login user is identical with the date sender user.

21 Claims, 11 Drawing Sheets

| STORED-JOB MANAGEMENT TABLE | | | |
|---|---|---|---|
| JOB NAME | USER ID | JOB CATEGORY | STORED DATE AND TIM |
| PCDocument01 | User 1 | PC PRINT JOB | 2013/07/01 14:33:21 |
| Fax01 | | FAX PRINT JOB | 2013/07/01 15:10:01 |
| Fax02 | | FAX PRINT JOB | 2013/07/01 18:43:45 |
| PCDocument02 | User 1 | PC PRINT JOB | 2013/07/01 20:17:23 |
| PCDocument03 | User 2 | PC PRINT JOB | 2013/07/02 08:26:13 |
| JpegImage01 | | MOBILE PRINT JOB | 2013/07/02 10:32:41 |
| PCDocument04 | User 3 | PC PRINT JOB | 2013/07/02 11:45:09 |
| Fax03 | | FAX PRINT JOB | 2013/07/02 14:21:53 |
| PCDocument05 | User 4 | PC PRINT JOB | 2013/07/02 16:58:37 |
| ⋮ | ⋮ | ⋮ | ⋮ |
| JpegImage02 | | MOBILE PRINT JOB | 2013/07/02 19:35:21 |

(56) References Cited

U.S. PATENT DOCUMENTS

2009/0268227 A1* 10/2009 Kaneko .................... 358/1.14
2013/0208299 A1*  8/2013 Doui ....................... 358/1.14

FOREIGN PATENT DOCUMENTS

| JP | 2006-341591 A | 12/2006 |
| JP | 2008-123030 A |  5/2008 |
| JP | 2012-242849 A | 12/2012 |

OTHER PUBLICATIONS

Office Action issued related Japanese Patent Application No. 2017-029708, dated Jan. 26, 2018.

* cited by examiner

31

| USER MANAGEMENT TABLE | | | |
|---|---|---|---|
| USER ID | PASSWORD | CARD ID | ADMINISTRATIVE PRIVILEGES |
| User1 | 9415 | 91245185 | YES |
| User2 | 5356 | 91243145 | NO |
| User3 | 2241 | 91259869 | NO |
| User4 | 5896 | 91251245 | NO |
| ⋮ | ⋮ | ⋮ | ⋮ |
| UserN | 3331 | 91253121 | YES |

FIG.3

STORED-JOB MANAGEMENT TABLE

| JOB NAME | USER ID | JOB CATEGORY | STORED DATE AND TIM |
|---|---|---|---|
| PCDocument01 | User1 | PC PRINT JOB | 2013/07/01 14:33:21 |
| Fax01 | | FAX PRINT JOB | 2013/07/01 15:10:01 |
| Fax02 | | FAX PRINT JOB | 2013/07/01 18:43:45 |
| PCDocument02 | User1 | PC PRINT JOB | 2013/07/01 20:17:23 |
| PCDocument03 | User2 | PC PRINT JOB | 2013/07/02 08:26:13 |
| JpegImage01 | | MOBILE PRINT JOB | 2013/07/02 10:32:41 |
| PCDocument04 | User3 | PC PRINT JOB | 2013/07/02 11:45:09 |
| Fax03 | | FAX PRINT JOB | 2013/07/02 14:21:53 |
| PCDocument05 | User4 | PC PRINT JOB | 2013/07/02 16:58:37 |
| ... | | ... | ... |
| JpegImage02 | | MOBILE PRINT JOB | 2013/07/02 19:35:21 |

FIG.4

PRINTER

CROSS REFERENCE TO RELATED APPLICATION

This application claims priority from Japanese Patent Application No. 2013-190801 filed on Sep. 13, 2013, the disclosure of which is herein incorporated by reference in its entirety.

BACKGROUND OF THE INVENTION

Field of the Invention

The present invention relates to techniques for performing printing based on data.

Discussion of Related Art

Conventionally, there is known a printing system having means for ensuring security for printed document. In such a printing system, data containing authentication information is transmitted from a data generating device to a print processing device, and the print processing device is configured, when authentication information coincident with the authentication information contained in the transmitted data is inputted thereto, to supply all the data to a printing portion.

SUMMARY OF THE INVENTION

However, the above-described conventional technique is for ensuring security for document that is printed based on data containing authentication information or other information by which the user is identifiable. However, in the conventional technique, no consideration has been given to security for document that is printed based on facsimile data or other data by which the user is unidentifiable.

In the present specification, there will be disclosed techniques for improving security of document printed based on data by which the user is unidentifiable.

A printer disclosed by the present specification includes: a receiver configured to receive authentication information inputted thereto; a printing portion; a processor configured to communicate with a storage device; and a memory storing instructions that, when executed by the processor, causes the printer to: authenticate a login user by using the authentication information received by the receiver; and determine whether the login user is successfully authenticated. When the login user is successfully authenticated, the instructions stored in the memory cause the printer to determine whether a user identity information is included in a print data. When the user identity information is included in the print data, the instructions stored in the memory cause the printer to determine whether the login user is identical with a user having sent the print data, by using the authentication information and the user identity information. When the login user is identical with the user having sent the print data, the instructions stored in the memory cause the printer to determine that the print data is an identifiable data and cause the printing portion to print the identifiable data. When the login user is not identical with the user having sent the print data, the instructions stored in the memory cause the printing portion to not print the print data. When the user identity information is not included in the print data, the instructions stored in the memory cause the printer to determine that the print data is an unidentifiable data and cause the printing portion to print the unidentifiable data irrespective of whether the login user is identical with the user having sent the print data.

BRIEF DESCRIPTION OF THE DRAWINGS

FIG. 3 is a view schematically showing a user management table.

FIG. 4 is a view schematically showing an stored-job management table.

DETAILED DESCRIPTION OF THE PREFERRED EMBODIMENTS

First Embodiment

A first embodiment will be described with reference to FIGS. 1-8.

(1) Construction of Printing System

Figure 1:
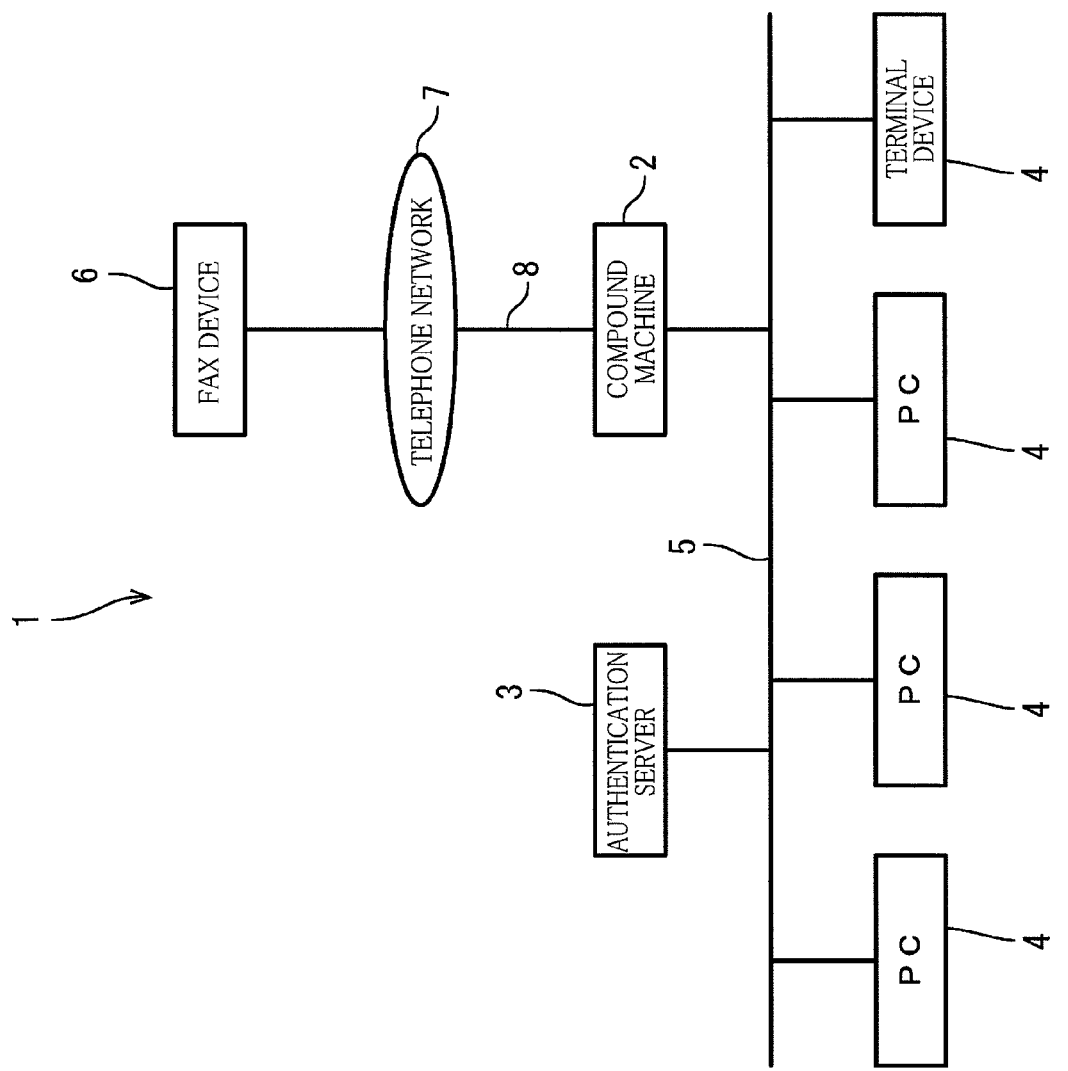
FIG. 1 is a view schematically showing a construction of a printing system according to a first embodiment of the invention.

Referring first to FIG. 1, there will be described a construction of a printing system 1 according to the first embodiment. The printing system 1 includes a compound machine (i.e. multi-function device) 2 as a printer constructed according to the first embodiment. The printing system 1 further includes an authentication server 3 and at least one terminal device 4.

The compound machine 2, the authentication server 3 and the at least one terminal device 4 are communicably connected to one another via a communication network 5 such as LAN (Local Area Network). Further, the compound machine 2 is connected to a telephone line 8, so that the compound machine 2 can transmit and receive FAX data to and from a FAX device 6 as an external device, through a telephone network 7. The term "FAX" is an abbreviation of facsimile.

The terminal device 4 may be a personal computer (hereinafter referred to as "PC") or a mobile terminal, for example. The mobile terminal may be a so-called smartphone or a tablet terminal, for example. A user can transmit a print job to the compound machine 2, by operating the terminal device 4.

The compound machine 2 has various functions such as printing function, image reading function, FAX function and direct printing function. The direct printing function is a function for printing an image represented by an image data that is memorized in a removable memory such as USB memory.

The authentication server 3 is a server for managing users in an integrated manner. The authentication server 3 memorizes therein, for example, a user management table 31 (see FIG. 3) that will be described later. The authentication server 3 will be described later.

(2) Electrical Arrangement of Compound Machine

Figure 2:
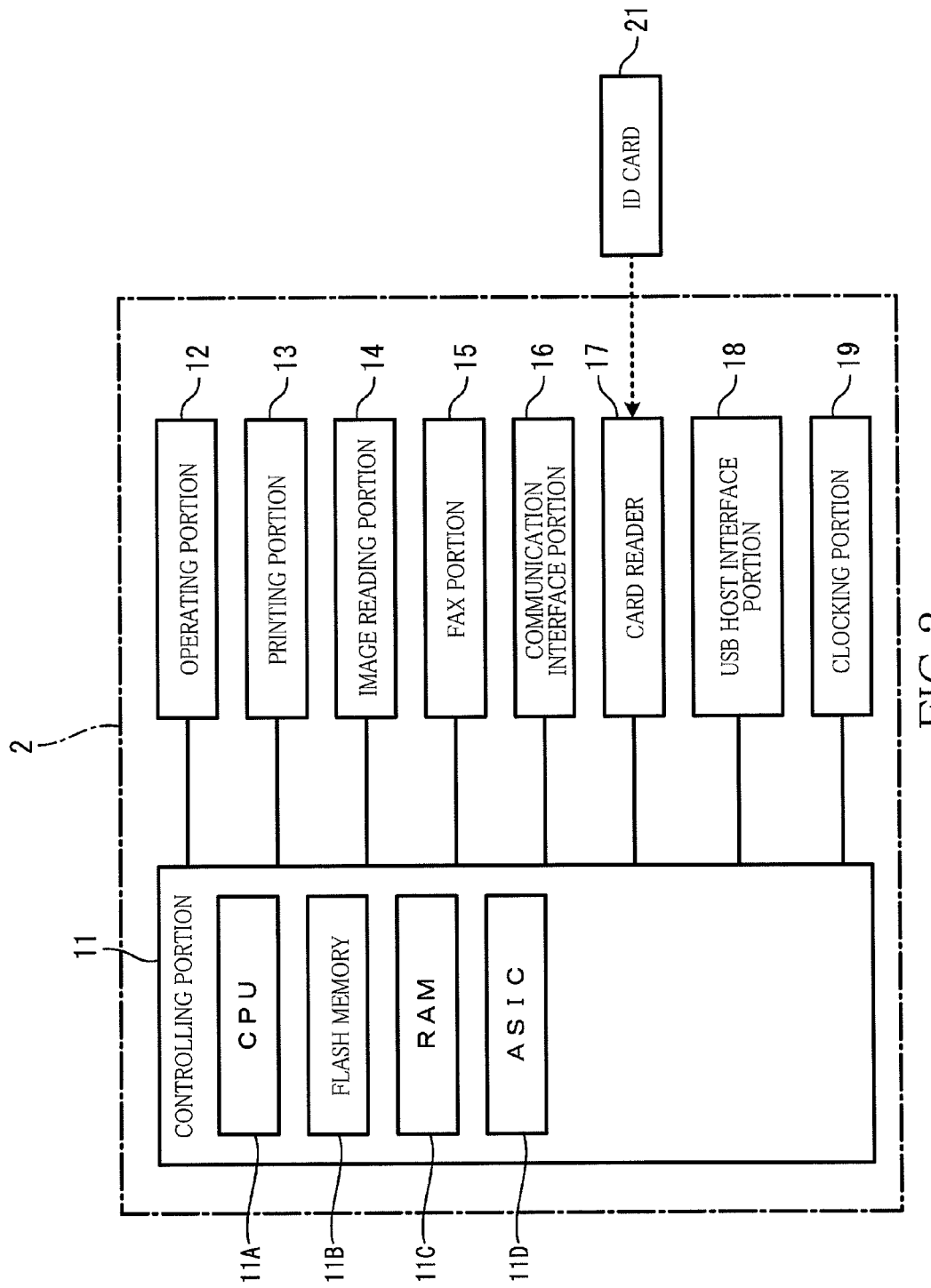
FIG. 2 is a block diagram showing, in a simplified manner, an electrical arrangement in a compound machine.

Referring next to FIG. 2, there will be described an electrical arrangement of the compound machine 2. The compound machine 2 is constructed to include a controlling portion 11, an operating portion 12, a printing portion 13, an image reading portion 14, a FAX portion 15, a communication interface portion 16, a card reader 17, a USB host interface portion 18 and a clocking portion 19.

The controlling portion 11 is constructed to include CPU 11A, a flash memory 11B, RAM 11C and ASIC 11D. The CPU 11A controls various portions by executing control programs memorized in the flash memory 11B. The flash memory 11B memorizes therein, for example, the control programs (which constitute instructions when the programs are executed by the CPU 11A) and various data. The RAM 11C is used as a main memory device, for enabling the CPU 11A to execute various processings. The RAM 11C memorizes therein, for example, print jobs and an stored-job management table 32 (see FIG. 4) that will be described later. The RAM 11C is an example of a storage device. Each of the CPU 11A and ASIC 11D is an example of a processor. The flash memory 11B is an example of a memory.

The operating portion 12 includes a display device (such as LCD display), a touch panel covering the display device and various kinds of operating buttons. The user can input various commands and information, by operating the operating portion 12.

The printing portion 13 prints an image represented by print data that is incorporated in the print job, onto a sheet such as a printing paper, by an electrographic or inkjet method.

The image reading portion 14 includes: a platen glass (on which original document is to be set); ADF (Auto Document Feeder) for feeding, one by one, a plurality of sheets of the original document; an image sensor; a light source for irradiating a light onto the document set on the platen glass or fed by the ADF; and an optical system for enabling the image sensor to form an image based on the light reflected from the document. Thus, the image reading portion 14 is configured to generate an image data by reading the original document.

The FAX portion 15 includes NCU (Network Control Unit), a modem and a control circuit for controlling the NCU and the modem. The FAX portion 15 transmits and receives FAX data to and from the FAX device 6 as an external device, through the telephone line 8.

The communication interface portion 16 is a hardware for connecting the compound machine 2 to the communication network 5.

The card reader 17 is a device for reading a card ID memorized in an ID card 21 and outputting the read card ID to the controlling portion 11. The user can cause the card reader 17 to read the card ID in a non-contact manner by bringing the ID card 21 into approximation with card reader 17, namely, by putting the ID card 21 over the card reader 17.

The USB host interface portion 18 is constructed to include a USB host controller and a jack to which a USB memory is connected. It is noted that the compound machine 2 may include, in place of or in addition to the USB host interface portion 18, a memory card reader having a memory slot whose configuration is in accordance with a standard of any one of various kinds of removable memories.

The clocking portion 16 is configured to measure a current time.

(3) Login to Compound Machine

For using the compound machine 2, the user is required to login by inputting the authentication information into the compound machine 2, prior to the use. In the present embodiment, two types of authentication information (a1), (a2) (that will be described below) are given to each one user. Each one user may input either one of the two types of authentication information, into the compound machine 2.

(a1) User ID and Password

Where a combination of the user ID and the password is used as the authentication information, the user inputs his or her own user ID and password through the operating portion 12 of the compound machine 2. In this case, the operating portion 12 is an example of a receiver.

(a2) Card ID

Where the card ID is used as the authentication information, the user puts the ID card 21 (that is given to the user in advance) over the card reader 17, so as to cause the card reader 17 to read the card ID. In this case, the card reader 17 is an example of the receiver.

When the authentication information is inputted to the compound machine 2, the compound machine 2 requests an authentication to the authentication server 3 by transmitting the authentication information to the authentication server 3. Then, if the compound machine 2 receives, from the authentication server 3, an authentication result indicative of authentication success, the compound machine 2 is placed in a login state in which use of the machine 2 is allowed. The login state is an example of successfully authenticated state.

When being placed in the login state, namely, when the login user is successfully authenticated, the compound machine 2 displays a menu screen (not shown) on the display device. By operating the menu screen, the login user can use the above-described image reading function, FAX function, copy function, direct printing function and do various settings.

As described in detail below, in a case that the print job or jobs are stored in the RAM 11C, the menu screen is not immediately displayed even when the compound machine 2 is placed into the login state. In the case that the print jobs are stored in the RAM 11C, when the compound machine 2 is placed into the login state, the stored print jobs start to be executed. During the execution of the print jobs, a message indicative of "PRINTING" is displayed on the display device. Then, after the execution has been completed, the menu screen is displayed. However, this does not mean that the menu screen cannot be displayed during execution of the print jobs. It is also possible to cause the compound machine 2 to display the menu screen even during execution of the print jobs, by operating an operating button.

The login state of the compound machine 2 is terminated when the user requests logoff on a logoff screen (not shown) that can be called from the menu screen, or when the operating portion 12 does not receive any operation for at least a given length of time. The termination of the login state is an example of cancel of the successfully authenticated state.

(4) Authentication by Authentication Server

There will be next described the authentication made by authentication server 3. In the authentication server 3, the user management table 31 shown in FIG. 3 is memorized. In the user management table 31, there are registered the user ID, password, card ID and presence/absence of administrative privileges. The administrative privileges are privileges that make it possible to make high level of settings or determinations to the compound machine 2. In the following description, the user having the administrative privileges will be referred to as administrator while the user not having the administrative privileges will be referred to as general user. Where the two categories of users do not have to be distinguished from each other, it will be referred simply to as user.

When receiving the authentication information in the form of the user ID and the password from the compound machine 2, the authentication server 3 judges whether the combination of the received user ID and the password is registered on the user management table 31 or not. In a case that the combination is registered on the user management table 31, the authentication server 3 transmits the authentication result indicative of authentication success, to the compound machine 2. In a case that the combination is not registered on the user management table 31, the authentication server 3 transmits the authentication result indicative of authentication failure, to the compound machine 2. When receiving the authentication information in the form of the card ID, the authentication server 3 judges whether the received card ID is registered on the user management table 31 or not. In a case that the card ID is registered on the user management table 31, the authentication server 3 transmits the authentication result indicative of authentication success, to the compound machine 2. In a case that the card ID is not registered on the user management table 31, the authentication server 3 transmits the authentication result indicative of authentication failure, to the compound machine 2.

(5) Print Job

There will be next described the print job that the compound machine 2 receives from the terminal device 4 and the FAX device 6. The print job is data containing various information and print data, based on which the printing portion 13 is caused to perform print. The various information represents a print condition (i.e., condition under which the printing portion 13 performs the printing based on the print data), the user ID of the user who had transmitted the print job, and category of the print job. The category of the print job will be described later in detail.

The compound machine 2 executes the print job so as to cause the printing portion 13 to perform the printing based on the print data included in the print job. In the following description, the sheet on which an image represented by the print data is printed, will be referred to as a printed object.

There will be next described the category of the print job. As examples of the category of the print job, there will be described PC print job, FAX print job and mobile print job.

(b1) PC Print Job

The PC print job is the print job transmitted from PC. The PC print job includes the user ID of the user who requested transmission of the PC print job. The user ID is information for uniquely identifying the user. The PC print job is an example of an identifiable data by which the user is identifiable. In the following description, the PC print job will be referred to as identifiable print job.

(b2) FAX Print Job

The FAX print job is a print job, based on which the FAX data received from the FAX device 6 as an external device is to be printed. The FAX print job is generated from the received FAX data. However, in the description of the present embodiment, for sake of simplicity, "receiving the FAX data" will be referred to as "receiving the FAX print job". In general, the FAX print job does not incorporate therein the user ID. In the present embodiment, either, the user ID is not incorporated in the FAX print job.

(b3) Mobile Print Job

The mobile print job is a print job received from the above-described mobile terminal. Whether or not the user ID is incorporated in the mobile print job is dependent on a print application program executed in the mobile terminal that transmitted the mobile print job. In the present embodiment, the print application program does not cause the user ID to be incorporated in the print job. Thus, in the present embodiment, the user ID is not incorporated in the mobile print job.

In the following description, the FAX print job and the mobile print job will be referred to as unidentifiable print job as a term that is generic to the FAX print job and the mobile print job. The unidentifiable print job is an example of unidentifiable data by which the user is unidentifiable.

(6) Identifiable-Data-Based Printing & Unidentifiable-Data-Based Printing

There will be next described an identifiable-data-based printing and an unidentifiable-data-based printing.

(6-1) Identifiable-Data-Based Printing

The identifiable-data-based printing is executing a print job as one of print jobs stored in the RAM 11C, which one incorporates therein a user ID identical with the user ID corresponding to the authentication information, in a case that the authentication is successfully done by using the authentication information inputted by the user, i.e., in a case that the compound machine 2 is placed into the login state. Thus, the print job is once stored in the RAM 11C without the print job being executed immediately after being received.

For executing the identifiable-data-based printing, the user ID has to be incorporated in the print job. As described above, since the user ID is incorporated in the PC print job, the user can execute identifiable-data-based printing, by transmitting the PC print job from the PC to the compound machine 2.

(6-2) Unidentifiable-Data-Based Printing

The unidentifiable-data-based printing is executing an unidentifiable-data-based print job stored in the RAM 11C, in a case that the authentication is successfully done by using the authentication information inputted by a user, i.e., in a case that the compound machine 2 is placed into the login state. The unidentifiable-data-based print job is executed in such a case, irrespective of whether or not the unidentifiable-data-based print job is a print job transmitted from the user who has inputted the authentication information. As in the identifiable-data-based printing, in the unidentifiable-data-based printing, the print job is once stored or held in the RAM 11C without the print job being executed immediately after being received.

(7) Storage of Print Jobs

Referring next to FIG. 4, there will be described the stored-job management table 32 memorized in the RAM 11C. It is noted that the stored-job management table 32 may be memorized also in the flash memory 11B.

In the stored-job management table 32, there are registered the job name, user ID, job category and stored date/time for each one the stored print jobs. In the user ID, the user ID incorporated in the corresponding print job is registered. However, as described above, since the unidentifiable-data-based print job does not incorporate therein a user ID, the user ID of the stored-job management table 32 is left blank in case of each unidentifiable-data-based print job.

Each print job is registered in the stored-job management table 32 after the print job has been completely received, except for some exceptional cases, which will be described later.

In the following description relating to the present embodiment, it is defined that, in a case that a print job is memorized in the RAM 11C but is not registered in the stored-job management table 32, the same print job is merely memorized in the RAM 11C without being stored in the RAM 11C. For example, in a case that it is determined that the unidentifiable-data-based printing is not to be executed in a storage determination (that will be described later), the compound machine 2 performs printing immediately when receiving the unidentifiable-data-based print job, with the unidentifiable-data-based print job being memorized in the RAM 11C, without the unidentifiable-data-based print job being registered in the stored-job management table 32, irrespective of whether the authentication has been done successfully or not. Similarly, in the case that it is determined that the identifiable-data-based printing is not to be executed in the storage determination, the compound machine 2 performs printing immediately when receiving the identifiable-data-based print job, with the identifiable-data-based print job being memorized in the RAM 11C, without the identifiable-data-based print job being registered in the stored-job management table 32, irrespective of whether the authentication has been done successfully or not.

(8) Settings in Compound Machine

During the login state of the compound machine 2, the user can make various settings in the compound machine 2, by calling a setting screen (not shown) from the above-described menu screen. Among the settings that can be made by the user, the storage determination and a print order determination will be described. In the present embodiment, the storage determination is a setting that can be made by only the administrator, so that the setting screen for making the storage determination is not displayed in case of the general user.

(8-1) Storage Determination

The storage determination includes a determination as to whether the identifiable-data-based printing is to be executed or not, and a determination as to whether the unidentifiable-data-based printing is to be executed or not. In the present embodiment, these two determinations can be made independently of each other. In a case of receiving the determination of not executing the identifiable-data-based printing, when receiving the identifiable-data-based print job thereafter, the compound machine 2 immediately performs printing based on the received identifiable-data-based print job, without storing the received identifiable-data-based print job. Similarly, in a case of receiving the determination of not executing the unidentifiable-data-based printing, when receiving the identifiable-data-based print job thereafter, the compound machine 2 immediately performs printing based on the received unidentifiable-data-based print job, without storing the received unidentifiable-data-based print job.

There is a case that the identifiable-data-based print job or jobs are already stored in the RAM 11C at a point of time at which the determination of not executing the identifiable-data-based printing is received by the compound machine 2. In such a case, the stored identifiable-data-based print job or jobs are deleted from the RAM 11C, without the identifiable-data-based print job or jobs being executed.

Similarly, there is also a case that the unidentifiable-data-based print job or jobs are already stored in the RAM 11C at a point of time at which the determination of not executing the unidentifiable-data-based printing is received by the compound machine 2. In such a case, the FAX print job, which is difficult to acquire again, is immediately executed, is immediately executed. However, the mobile print job, which is easy to acquire again, is deleted from the RAM 11C without it being executed.

The FAX print job is an example of data of a particular category while the mobile print job is an example of data of another category that is other than the particular category. Further, a processing for receiving the determination of executing or not executing the identifiable-data-based printing and a processing for receiving the determination of executing or not executing the unidentifiable-data-based printing are examples of a determination processing. It is noted that receiving the determination of executing the unidentifiable-data-based printing may be referred also to as receiving a set command to cause a setting to be input to the receiver in the form of the operating portion 12 or card reader 17, wherein the setting indicates to hold the unidentifiable print job in the RAM 11C without printing based on the unidentifiable print job until the login user is successfully authenticated. It is also noted that the determination of not executing the unidentifiable-data-based printing may be referred also to as receiving a cancel command to cancel the above-described setting.

The reason why a general user cannot make the storage determination is that it is not desirable that the general user deletes other user's print job. However, it is possible to allow any general user to change the setting of not executing the identifiable-data-based printing, into a setting of executing the identifiable-data-based printing, and to allow any user to change the setting of not executing the unidentifiable-data-based printing, to a setting of executing the unidentifiable-data-based printing. This is because there is no risk that the general user deletes the other user's print job in the setting of executing the identifiable-data-based printing or the unidentifiable-data-based printing.

In the present embodiment, in a case that it is determined in the storage determination that the identifiable-data-based printing or the unidentifiable-data-based printing is to be executed, when the identifiable-data-based print job or unidentifiable-data-based print job of the user having logged into the compound machine 2 is stored in the RAM 11C, the above-described menu screen is not displayed immediately upon placement of the compound machine 2 into the login state, and is displayed after the print job stored in the RAM 11C have been executed. However, in case of the administrator, the execution of the print job stored in the RAM 11C may be in standby and the menu screen may be displayed before the execution of the print job, so that the identifiable-data-based printing and unidentifiable-data-based printing are executed when the administrator has requested the printing on the menu screen. It is noted that the administrator can login to the compound machine 2 from also an external device via the communication network 5, so as to make various settings.

(8-2) Print Order Determination

The print order determination is made, in a case that it is determined in the storage determination that the identifiable-data-based printing and unidentifiable-data-based printing are both to be executed, for determining which one of the identifiable-data-based printing and unidentifiable-data-based printing is to be executed earlier than the other, when the authentication is successfully done, namely, when the compound machine 2 is placed in the login state. For example, when the user determined that the identifiable-data-based printing is to be executed earlier, the compound machine 2 executes the identifiable-data-based print job and the unidentifiable-data-based print job in this order of description. When the user determined that the unidentifiable-data-based printing is to be executed earlier, the compound machine 2 executes the unidentifiable-data-based print job and the identifiable-data-based print job in this order of description.

(9) Processings to be Executed by Compound Machine

There will be described processings that are to be executed by the compound machine 2. Among various processings to be executed by the compound machine 2, there will be described particularly the log-in processing, identifiable-data-based print/unidentifiable-data-based print processing, print-job receive/storage processing and storage determination processing. It is noted that the print-job receive/storage processing is a processing that is to be executed only in a case that the above-described determination of executing the unidentifiable-data-based printing has been made in the storage determination.

(9-1) Login Processing

Figure 5:
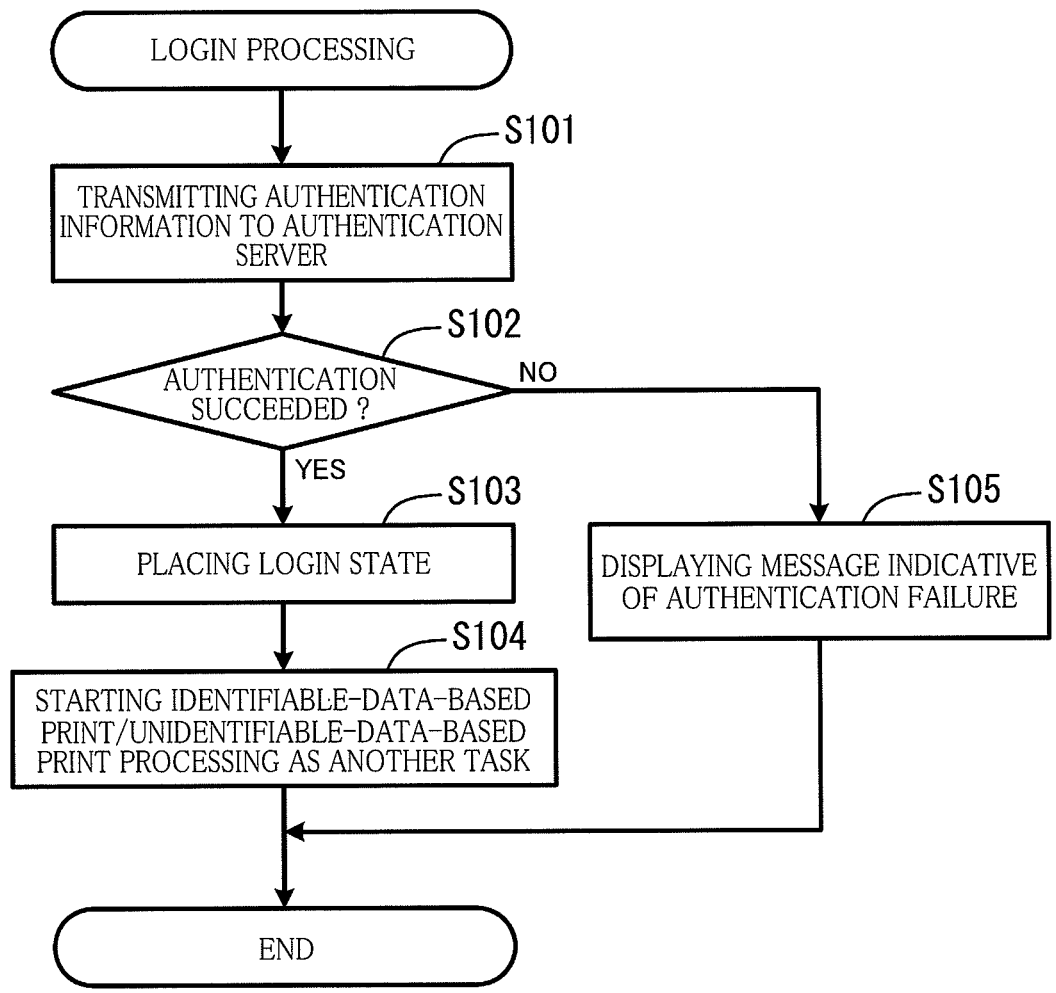
FIG. 5 is a flow chart showing a login processing.

Referring first to FIG. 5, there will be described the login processing. This login processing is initiated upon reception of the authentication information inputted by a user when the compound machine 2 is not in the login state.

In S101, the CPU 11A transmits the authentication information in the form of the combination of the user ID and password inputted by the user or the card ID outputted by the card reader 17, to the authentication server 3.

In S102, the CPU11A judges whether the authentication has been successfully done or not. This judgment is made based on the authentication result transmitted from the authentication server 3. If the authentication has been successfully done (S102: Yes), the control flow goes to S103. If the authentication has not been successfully done (S102: No), the control flow goes to S105. It is noted that there could be a case that the authentication result is not transmitted even after a given length of time has passed after the implementation of S101 in which the authentication information is transmitted to the authentication server 3. In such a case, it is regarded that the authentication failed.

In S103, the CPU 11A places the compound machine 2 into the login state.

In S104, the CPU 11A starts the identifiable-data-based print/unidentifiable-data-based print processing as another task. The identifiable-data-based print/unidentifiable-data-based print processing is a processing for performing the identifiable-data-based printing and unidentifiable-data-based printing that will be described later.

In S105, the CPU 11A causes the display device to display a message indicative of authentication failure.

As described above, the CPU 11A causes the identifiable-data-based print/unidentifiable-data-based print processing to start as another task, after the placement of the compound machine 2 into the login state. Therefore, the user can make the logoff on the logoff screen in parallel with execution of the identifiable-data-based print/unidentifiable-data-based print processing. The CPU 11A continues the execution of the identifiable-data-based print/unidentifiable-data-based print processing even if the logoff is made before completion of the identifiable-data-based print/unidentifiable-data-based print processing.

(9-2) Identifiable-Data-Based Print/Unidentifiable-Data-Based Print Processing

Figure 6:
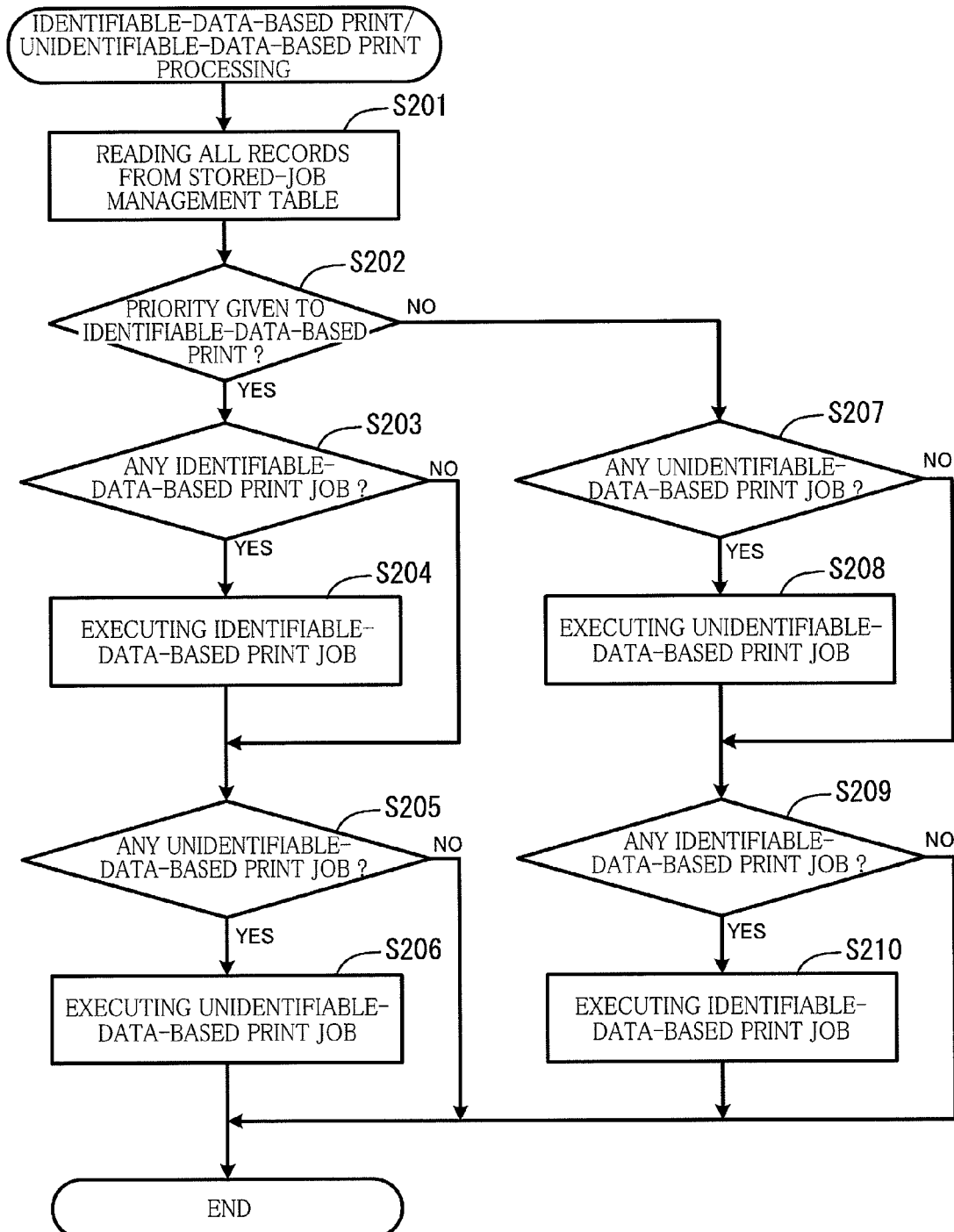
FIG. 6 is a flow chart showing an identifiable-data-based print/unidentifiable-data-based print processing.

Referring next to FIG. 6, there will be described the identifiable-data-based print/unidentifiable-data-based print processing caused to start at S104.

In S201, the CPU 11A reads out records of all of the print jobs from the stored-job management table 32.

In S202, the CPU 11A judges whether it has been determined in the print order determination that the identifiable-data-based printing is to be prioritized or the unidentifiable-data-based printing is to be prioritized. In a case that the determination of prioritizing the identifiable-data-based printing has been made (S202: Yes), the control flow goes to S203. In a case that the determination of prioritizing the identifiable-data-based printing has been made (S202: No), the control flow goes to S207.

In S203, the CPU 11A judges whether or not the RAM 11C stores therein any identifiable-data-based print job incorporating therein a user ID (i.e., user identity information) identical with the user ID that corresponds to the inputted authentication information. This judgment is made by seeing if such an identifiable-data-based print job is included in the records that were read out from the stored-job management table 32 in S201. The control flow goes to S204 in a case that the corresponding identifiable-data-based print job is stored in the RAM 11C (S203: Yes), and goes to S205 in a case that the corresponding identifiable-data-based print job is not stored in the RAM 11C (S203: No).

In this instance, since the CPU 11A makes the above judgment in view of the records read in S201, an identifiable-data-based print job, which is registered in the stored-job management table 32 after the records are read in S201, cannot be the above-described corresponding identifiable-data-based print job. That is, the print job, which is completely received before the compound machine 2 is placed into the login state, can be subjected to the print processing executed at this time. On the other hand, the print job, which is completely received after the compound machine 2 is placed into the login state, can not be subjected to the print processing executed at this time. The same thing can be said also in S205, S207, S209 that will be described below.

In S204, the CPU 11A executes all of the corresponding identifiable-data-based print jobs. S204 is an example of the identifiable-data-based print processing.

In S205, the CPU 11A judges whether or not the RAM 11C stores therein any unidentifiable-data-based print job. This judgment is made by seeing if any unidentifiable-data-based print job is included in the records that were read out from the stored-job management table 32 in S201. The control flow goes to S206 in a case that the unidentifiable-data-based print job is stored in the RAM 11C (S205: Yes). In a case that the unidentifiable-data-based print job is not stored in the RAM 11C (S205: No), the present processing ends.

In S206, the CPU 11A executes all of the unidentifiable-data-based print jobs stored in the RAM 11C. S206 is an example of the unidentifiable-data-based print processing.

In S207, the CPU 11A judges whether or not the RAM 11C stores therein any unidentifiable-data-based print job.

The control flow goes to S208 in a case that the unidentifiable-data-based print job is stored in the RAM 11C (S207: Yes), and goes to S209 in a case that the unidentifiable-data-based print job is not stored in the RAM 11C (S207: No).

In S208, the CPU 11A executes all of the unidentifiable-data-based print jobs stored in the RAM 11C. S208 is an example of the unidentifiable-data-based print processing.

In S209, the CPU 11A judges whether or not the RAM 11C stores therein any identifiable-data-based print job incorporating therein a user ID identical with the user ID that corresponds to the inputted authentication information. The control flow goes to S210 in a case that the corresponding identifiable-data-based print job is stored in the RAM 11C (S209: Yes). In a case that the corresponding identifiable-data-based print job is not stored in the RAM 11C (S209: No), the present processing ends.

In S210, the CPU 11A executes all of the corresponding identifiable-data-based print jobs. S210 is an example of the identifiable-data-based print processing.

Upon placement of the compound machine 2 into the login state, in a case that the corresponding identifiable-data-based print job and unidentifiable-data-based print job are not stored in the RAM 11C (S203: No; S205: No and S207: No; S209: No), or in a case that the corresponding identifiable-data-based print job and unidentifiable-data-based print job have been completely executed (S206, S201), the CPU 11A causes the display device to display the above-described menu screen, as long as the user does not logoff. Thus, the user can execute the other processings and settings.

(9-3) Print-Job Receive/Storage Processing

Next, the print-job receive/storage processing will be described. There will be described a case in which the terminal device 4 and the FAX device 6 transmit a plurality of partial print jobs (into which each single print job is divided) to the compound machine 2. Except for some exceptional cases, the compound machine 2 registers each print job in the stored-job management table 32, after all of the plurality of partial print jobs constituting the single print job have been completely received. As the above-described exceptional cases, there is a case that an available space or free space of the RAM 11C is small.

Figure 7:
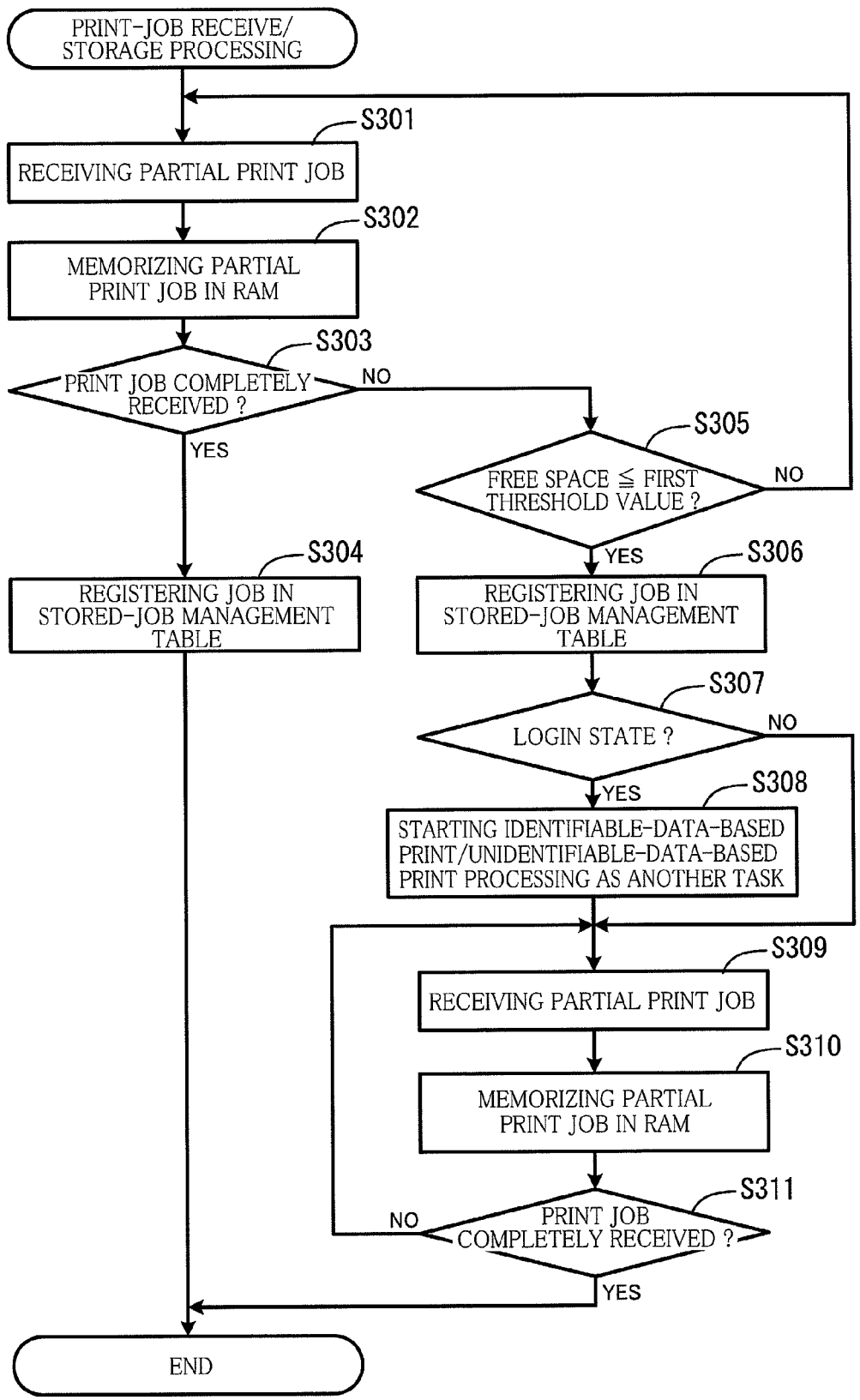
FIG. 7 is a flow chart showing a print-job receive/storage processing.

Referring to FIG. 7, there will be described flow of the print-job receive/storage processing. This processing is initiated upon transmission of the print job from the terminal device 4 or the FAX device 6 as the external device.

In S301, the CPU 11A receives the partial print job.

In S302, the CPU 11A causes the RAM 11C to memorize the received partial print job.

In S303, the CPU 11A judges whether the reception of the entire or single print job has been completed or not. In a case that it has been completed (S303: Yes), the control flow goes to S304. In a case that it has not been completed (S303: No), the control flow goes to S305.

In S304, the CPU 11A registers the completely received print job in the stored-job management table 32.

In S305, the CPU 11A judges whether the free space of the RAM 11C is equal or smaller than a first threshold value. The first threshold value is a reference value for judging whether the free space of the RAM 11C is small or not. Specifically, the first threshold value may be 5-20% of a total storage space of the RAM 11C. However, the first threshold value does not necessarily have to be 5-20%, but may be determined suitably as needed. In a case that the free space of the RAM 11C is equal to or smaller than the first threshold value (S305: Yes), the control flow goes to S306. In a case that it is larger than the first threshold value (S305: No), the control flow goes back to S301.

In S306, the CPU 11A registers the print job that is being currently received, in the stored-job management table 32. That is, in a case that the free space of the RAM 11C is small, the currently received print job is also registered in the stored-job management table 32.

In S307, the CPU 11A judges whether the compound machine 2 is in the login state or not. This judgment is made for reason given below.

Since the above-described identifiable-data-based print/unidentifiable-data-based print processing is caused to start only once upon placement of the compound machine 2 into the login state, there would be a case that the identifiable-data-based print/unidentifiable-data-based print processing has already ended when the currently received print job is registered in the stored-job management table 32 even if the compound machine 2 is in the login state. In such a case, the processing is not executed immediately even if the currently received print job is registered in the stored-job management table 32. Therefore, for restarting the identifiable-data-based print/unidentifiable-data-based print processing as long as the user is logging in, the CPU 11A judges in S307 whether the compound machine 2 is in the login state or not.

The control flow goes to S308 in a case that the compound machine 2 is in the login state (S307: Yes), and goes to S309 in a case that the compound machine 2 is not in the login state (S307: No).

In S308, the CPU 11A starts the identifiable-data-based print/unidentifiable-data-based print processing as another task. The currently received print job is executed after it is judged at S311 (that will be described later) that the reception of the print job is completed. That is, the CPU 11A registers also the currently received print job in the stored-job management table 32, but executes the print job after the print job is completely received.

The affirmative judgment in S307 that the compound machine 2 is in the login state, means that the reception of the currently received print job is completed after the authentication is successfully done. That is, in the case that the free space of the RAM 11C is not larger than the first threshold value, the CPU 11A executes also the print job, which is completely stored in the RAM 11C after the authentication is done successfully.

In S309, the CPU 11A receives the partial print job.

In S310, the CPU 11A causes the RAM 11C to memorize the received partial print job.

In S311, the CPU 11A judges whether the reception of the entire or single print job has been completed or not. In a case that it has been completed (S311: Yes), the present processing ends. In a case that it has not been completed (S311: No), the control flow goes back to S309 so as to repeat the processing.

(9-4) Storage Determination Processing

Figure 8:
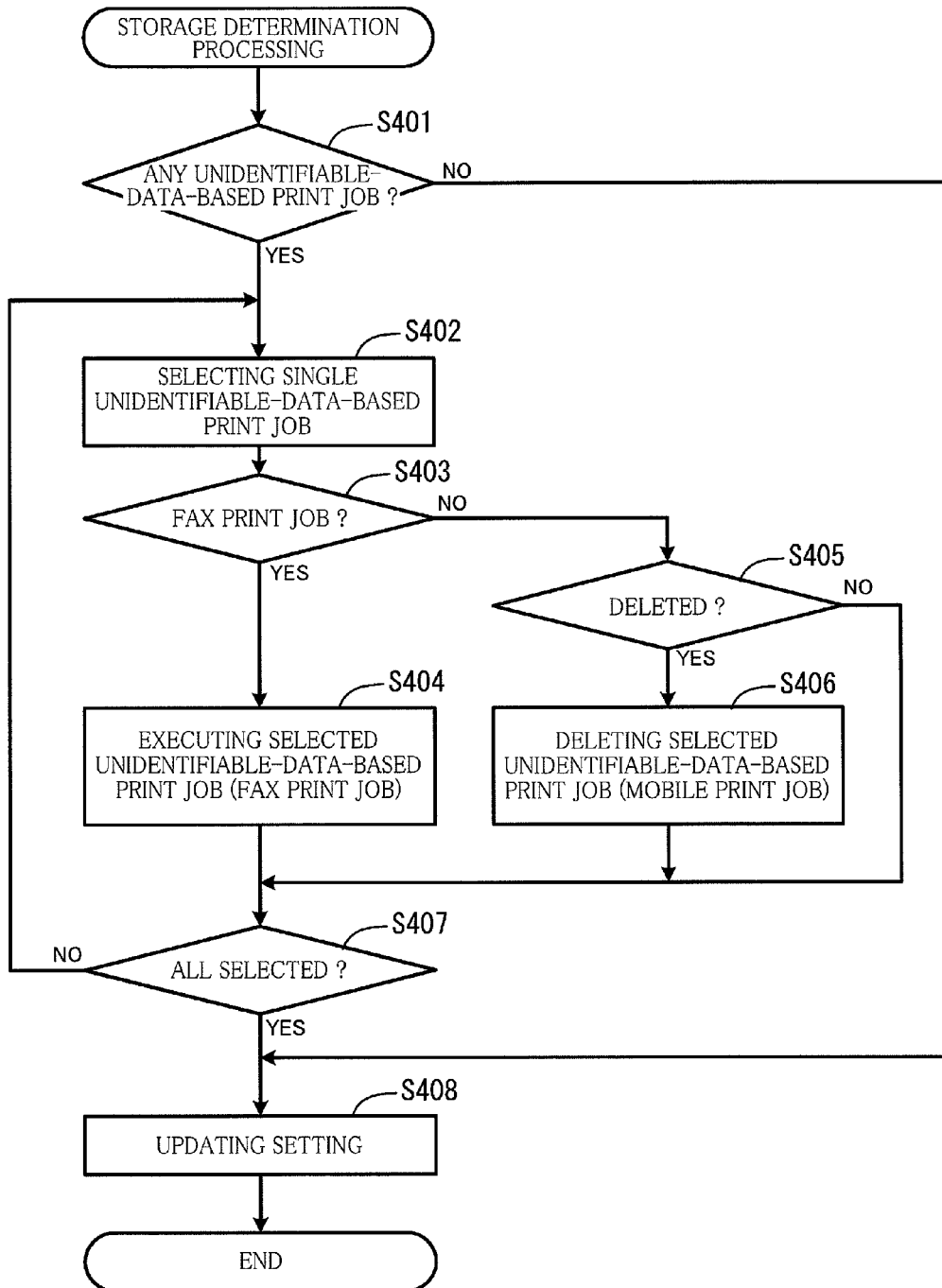
FIG. 8 is a flow chart showing a storage determination processing.

Referring next to FIG. 8, there will be described the storage determination processing. This processing is initiated in a case that the determination of not executing the unidentifiable-data-based printing is received in the above-described storage determination.

In S401, the CPU 11A judges whether or not the RAM 11C stores therein any unidentifiable-data-based print job. This judgment is made by seeing the stored-job management table 32. The control flow goes to S402 in a case that the unidentifiable-data-based print job is stored in the RAM 11C (S401: Yes). In a case that the unidentifiable-data-based print job is not stored in the RAM 11C (S401: No), the control flow goes to S408.

In S402, the CPU 11A selects one from among the unidentifiable-data-based print jobs stored in the RAM 11C.

In S403, the CPU 11A judges whether the unidentifiable-data-based print job selected in S402 is a FAX print job or not. In a case that it is a FAX print job (S403: Yes), the control flow goes to S404. In a case that it is not a FAX print job but a mobile print job (S403: No), the control flow goes to S405.

In S404, the CPU 11A immediately executes the FAX print job, i.e., the unidentifiable-data-based print job selected in S402.

In S405, the CPU 11A causes the display device to display a selection screen for receiving, from the user, a selection as to whether the mobile print job, i.e., the unidentifiable-data-based print job selected in S402 is to be deleted or not. Then, the CPU 11A receives the selection from the user. In a case that the user selected an option of deleting the mobile print job (S405: Yes), the control flow goes to S406. In a case that the user selected an option of not deleting the mobile print job (S405: No), the control flow goes to S407.

In S406, the CPU 11A deletes, from the RAM 11C, the mobile print job, i.e., the unidentifiable-data-based print job that was selected in S402.

In S407, the CPU 11A judges whether all of the unidentifiable-data-based print jobs stored in the RAM 11C have been selected or not. In a case that all of them have been selected (S407: Yes), the control flow goes to S408. In a case that there is still at least one unidentifiable-data-based print job not selected yet (S407: No), the control flow goes back to S402 so as to repeat the processing.

In S408, the CPU 11A updates the settings or determinations. Specifically, for example, the CPU 11A sets off a flag indicative of whether the unidentifiable-data-based printing is to be executed. While this flag is off, even if the unidentifiable-data-based print job is received by the compound machine 2, the received unidentifiable-data-based print job is not stored in the RAM 11C, so that the unidentifiable-data-based print job is immediately executed irrespective of whether the compound machine 2 is in the login state or not.

(10) Effects in the Embodiment

In a case that an authentication has been successfully done by using an authentication information, there is a high possibility that the user having inputted the authentication information is a reliable or authentic user. In the compound machine 2, when an unidentifiable-data-based print job is received by the compound machine 2, the received unidentifiable-data-based print job is stored in the RAM 11C without the received unidentifiable-data-based print job being immediately executed. Rather, the received unidentifiable-data-based print job is executed when the authentication has been successfully done by using the authentication information received through the operating portion 12 or card reader 17 that are provided in the compound machine 2, so that there is a high possibility that the authentic user is present near the compound machine 2 during execution of the unidentifiable-data-based print job. Therefore, as compared with an arrangement in which the unidentifiable-data-based print job is executed without the authentication being done, it is possible to improve security for printed document that is printed based on the unidentifiable-data-based print job in the compound machine 2.

Further, in the compound machine 2, the received identifiable-data-based print job is stored in the RAM 11C, and the stored identifiable-data-based print job is executed in the case that the authentication has been successfully done by using the authentication information received through the operating portion 12 or the card reader 17 that are provided in the compound machine 2, so that there is a high possibility that the authentic user is present near the compound machine 2 during execution of the identifiable-data-based print job. Therefore, as compared with an arrangement in which the identifiable-data-based print job is executed without the authentication being done, it is possible to improve security for printed document that is printed based on the identifiable-data-based print job in the compound machine 2.

Further, since the compound machine 2 receives one of the selection of executing the unidentifiable-data-based printing and the selection of not executing the unidentifiable-data-based printing, the user can make a setting as to whether the unidentifiable data is to be stored, namely, the user can determines whether the unidentifiable data is to be stored or not.

Further, in the compound machine 2, in the case that the selection of not executing the unidentifiable-data-based printing is received in the storage determination, the FAX print job as the particular category of the unidentifiable-data-based print job stored in the RAM 11C is immediately executed. In general, a person who transmits the FAX print job is not identical with the user who uses the printed object printed based on the transmitted FAX print job. There is a case where it is not easy for the user (who uses the printed object) to request the person to retransmit the FAX print job having the same contents, after the FAX print job is deleted. Therefore, the FAX print job is executed without it being deleted, so as to avoid necessity of requesting retransmission of the FAX print job of the same contents when the printed object is required later.

Further, in the compound machine 2, in the case that the selection of not executing the unidentifiable-data-based printing is received in the storage determination, the mobile print job, i.e., the print job other than the FAX print job is deleted from the RAM 11C, without it being executed. In general, a person who transmits the mobile print job is identical with the user who uses the printed object printed based on the transmitted mobile print job. Therefore, if the user requires the printed object after the mobile print job is deleted, the user himself or herself can retransmit the mobile print job having the same contents. Thus, in a case where it is easy to receive the mobile print job of the same contents even after deleting it, the mobile print job already stored in the RAM 11C is deleted, so that it is possible to improve the security of the printed document as compared with an arrangement in which the already stored mobile print job is left stored in the RAM 11C.

Further, in the compound machine 2, in the case that the free space of the RAM 11C is larger than the first threshold value, the print job, which is completely stored into the RAM 11C after the authentication is made successfully, is not executed. If the print job completely stored into the RAM 11C after the authentication is made successfully, were also executed, unexpected printing would be performed thereby causing a risk that the user could be confused. In the compound machine 2, since the print job completely stored into the RAM 11C after the authentication is made successfully is not executed, it is possible to reduce the unexpected printing.

Further, in the compound machine 2, in the case that the free space of the RAM 11C is not larger than the first threshold value, the print job completely stored into the RAM 11C after the authentication is made successfully, is also executed, so that the free space of the RAM 11C can be increased at an earlier point of time, as compared with an arrangement in which the print job completely stored into the RAM 11C after the authentication is made successfully is not executed.

Further, in the compound machine 2, even if the logoff is made during execution of the identifiable-data-based print/unidentifiable-data-based print processing, the identifiable-data-based print/unidentifiable-data-based print processing is continued, the user can get the printed object printed based on the unidentifiable-data-based print job even after the successfully authenticated state is cancelled. In other words, the user can make the logoff before the identifiable-data-based print/unidentifiable-data-based print processing ends.

Second Embodiment

Figure 9:
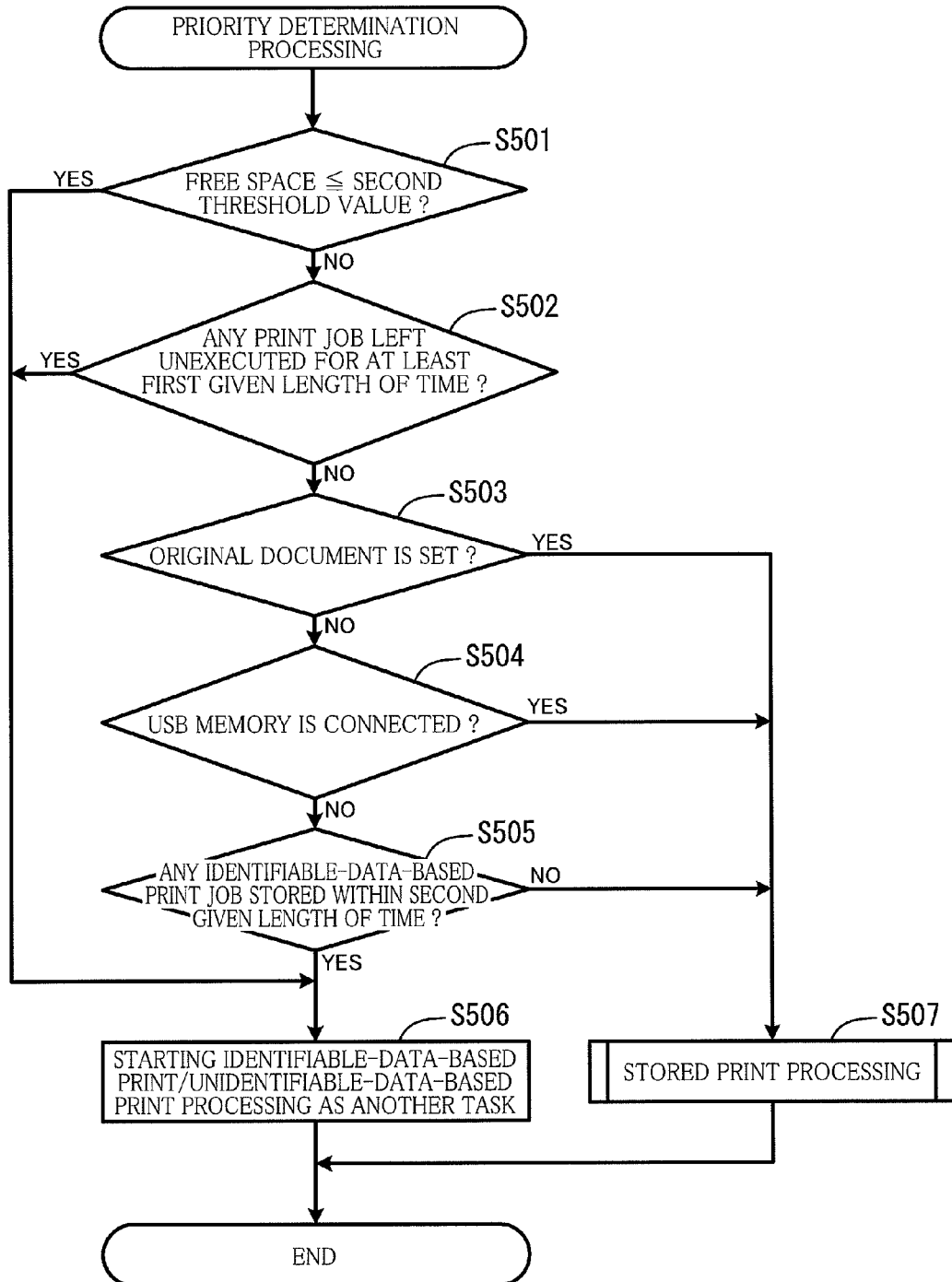
FIG. 9 is a flow chart showing a priority determination processing in a second embodiment of the invention.
Figure 10:
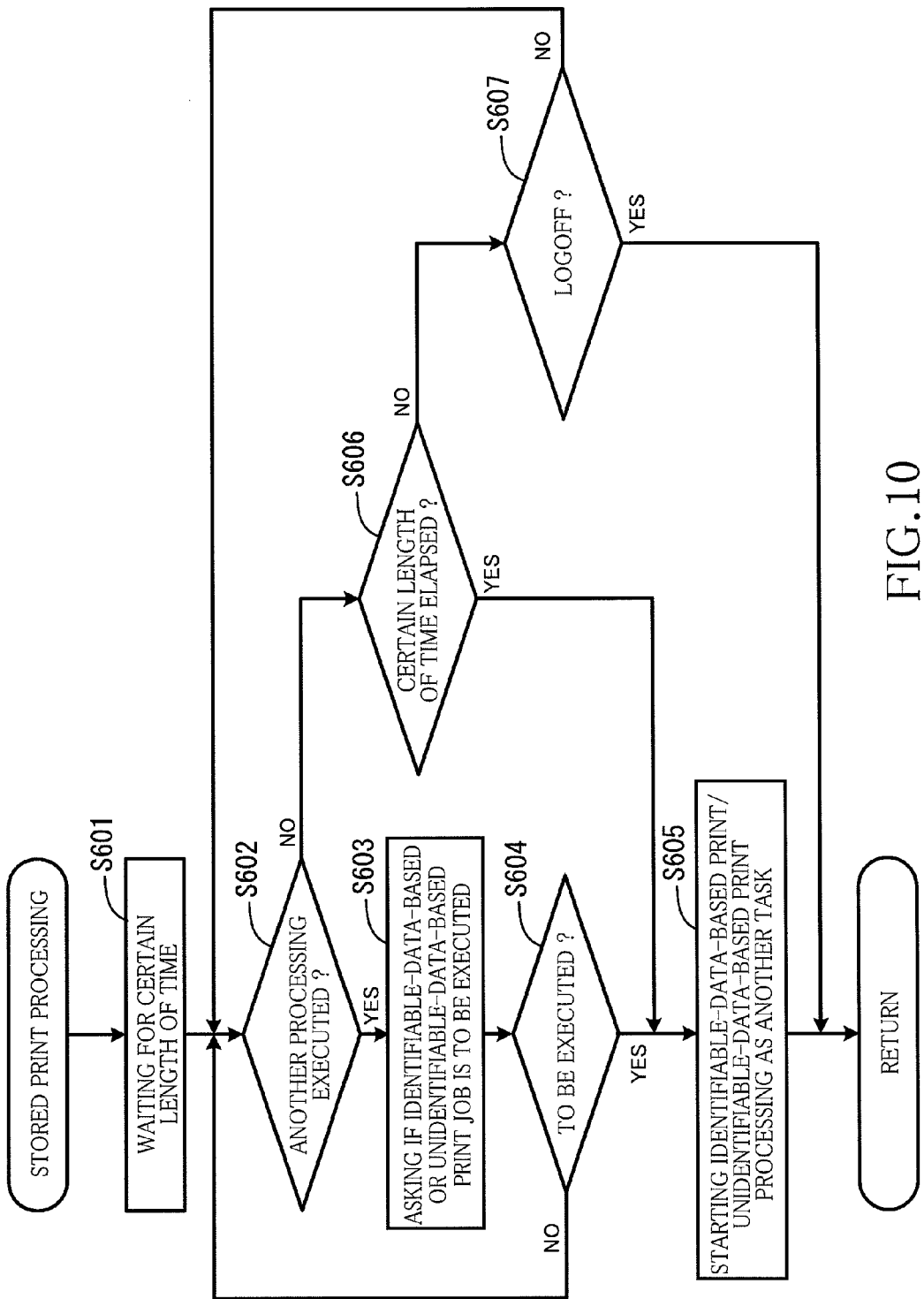
FIG. 10 is a flow chart showing a stored print processing.

Referring next to FIGS. 9 and 10, there will be described a second embodiment of the invention.

In the above-described first embodiment, the login processing is executed such that the identifiable-data-based print/unidentifiable-data-based print processing is started in S104 after the authentication is successfully done in S102. However, the user does not necessarily input the authentication information for the purpose of executing the identifiable-data-based print/unidentifiable-data-based print processing. There is a case where the user inputs the authentication information for the purpose of using the printing portion 13 to execute the other processing such as a copy processing for performing the above-described copying function and a direct print processing for performing the above-described direct printing function. The identifiable-data-based print/unidentifiable-data-based print processing is an example of a processing for causing the printing portion to perform printing based on data stored in the storage device.

In a case that the user inputs the authentication information for using the printing portion 13 for the other processing, if the identifiable-data-based print/unidentifiable-data-based print processing were executed prior to execution of the other processing, the other processing that the user wants to execute would be executed later.

Therefore, in the compound machine 2 according to the second embodiment, when the compound machine 2 is placed in the login state, it is judged whether there is a possibility that the printing portion 13 is used for the other processing. In a case that there is the possibility that it is used for the other processing, the other processing is executed prior to execution of the identifiable-data-based print/unidentifiable-data-based print processing.

(1) Judgment as to Whether there is a Possibility that the Printing Portion is to be Used for the Other Processing The CPU 11A judges that there is the possibility that the printing portion 13 is to be used for the other processing, in cases of (c1)-(c3) as indicated below.

(c1) In a Case that Original Document is Set on ADF or Platen Glass

In the case that original document is set on the ADF or platen glass of the image reading portion 14, there is a possibility that the copy processing is to be executed. Therefore, in such a case, the compound machine 2 judges that there is a possibility that the printing portion 13 is to be used for the other processing.

(c2) In a Case that USB Memory is Attached to USB Host Interface

In the case that USB memory is attached to the USB host interface 18, there is a possibility that the direct print processing is to be executed. Therefore, in such a case, the compound machine 2 judges that there is a possibility that the printing portion 13 is to be used for the other processing.

(c3) In a Case that a Given Length of Time Elapsed after Identifiable-Data-Based Print Job is Stored There is a tendency that the user who immediately needs a printed object printed based on the identifiable-data-based print job, inputs the authentication information to the compound machine 2 within a short time such as 2-3 minutes after transmitting the identifiable-data-based print job to the compound machine 2. In other words, it is assumed that the user does not immediately need the printed object, in a case that the user did not input the authentication information to the compound machine 2 within the short time after transmission of the identifiable-data-based print job.

In a case that the user, who did not input the authentication information within the short time, inputs the authentication information after the short time elapsed, it is assumed that the user does not immediately need the print object printed based on the identifiable-data-based print job. Thus, in this case, it is not possible to deny the possibility that the user inputted the authentication information for the purpose of using the printing portion 13 for the other processing. Therefore, the CPU 11A judges that there is the possibility that the printing portion 13 is to be used for the other processing, in the case that the user, who did not input the authentication information within the short time such as 2-3 minutes after transmitting the identifiable-data-based print job, inputs the authentication information after the short time elapsed.

(2) Exception of Case of Execution of the Other Processing Before Execution of the Identifiable-Data-Based Print/Unidentifiable-Data-Based Print Processing In a case that the free space of the RAM 11C is small, it is desirable to early execute the print job stored in the RAM 11C, so as to increase the free space of the RAM 11C at an early point of time. Further, in a case that the identifiable-data-based print job or unidentifiable-data-based print job is not executed even when a long time such as one day has elapsed after the print job had been stored in the RAM 11C, it is desirable to early execute the pint job, so as to make it possible to memorize other print jobs.

Therefore, in the case that the free space of the RAM 11C is small and also in the case that there is the identifiable-data-based print job or unidentifiable-data-based print job that is left for a long time such as one day after having been stored into the RAM 11C, the CPU 11A exceptionally executes the identifiable-data-based print/unidentifiable-data-based print processing earlier than other processing, without judging whether or not there is a possibility that the printing portion 13 is to be used for the other processing.

(3) Priority Determination Processing

Referring next to FIG. 9, there will be described a priority determination processing that is executed for determining which one of the identifiable-data-based print/unidentifiable-data-based print processing and the other processing is to be executed before execution of the other. In the compound machine 2 according to the present second embodiment, at S104 of the login processing shown in FIG. 5, the priority determination processing in place of the identifiable-data-based print/unidentifiable-data-based print processing, is started as another task. Except for this arrangement, the login processing in the present second embodiment is substantially identical with the login processing in the first embodiment. Thus, after the compound machine 2 is placed in the login state (S103), the priority determination processing is started.

In S501, the CPU 11A determines whether the free space of the RAM 11C is equal to or smaller than a second threshold value. The second threshold value is a reference value for judging whether the free space of the RAM 11C is small or not. Specifically, the second threshold value may be 5-20% of a total storage space of the RAM 11C. However, the second threshold value does not necessarily have to be 5-20%, but may be determined suitably as needed.

In a case that the free space of the RAM 11C is equal to or smaller than the second threshold value (S501: Yes), the control flow goes to S506 in which the CPU 11A exceptionally executes the identifiable-data-based print/unidentifiable-data-based print processing. In a case that it is larger than the second threshold value (S501: No), the control flow goes to S502.

In S502, the CPU 11A judges whether at least one of the identifiable-data-based print jobs which are stored in the RAM 11C and which incorporate therein a user ID identical with the user ID corresponding to the authentication information, is left for at least a first given length of time after being stored into the RAM 11C, and judges whether at least one of the unidentifiable-data-based print jobs which are stored in the RAM 11C, is left for at least the first given length of time after being stored into the RAM 11C. The first given length of time is a long time such as one day.

In a case that a time difference between a point of time at which at least one of them is stored into the RAM 11C and the current time is at least the first length of time, namely, in a case that there is at least one print job that is left for at least the first given length of time (S502: Yes), the control flow exceptionally goes to S506 in which the identifiable-data-based print/unidentifiable-data-based print processing is executed. On the other hand, in a case that there is no print job left for at least the first given length of time (S502: No), the control flow goes to S503.

In S503, the CPU 11A judges whether an original document is set on at least one of the ADF and the platen glass. In a case that it is set on neither the ADF nor the platen glass (S503: No), the control flow goes to S504. In a case that it is set on at least one of the ADF and the platen glass (S503: Yes), the control flow goes to S507. S503 is an example of a judge processing.

In S504, the CPU 11A judges whether or not a USB memory is attached to the USB host interface portion 18. In a case that it is not attached to the USB host interface portion 18 (S504: No), the control flow goes to S505. In a case that it is attached to the USB host interface portion 18 (S504: Yes), the control flow goes to S507. S504 is an example of the judge processing.

In S505, the CPU 11A judges whether at least one of the identifiable-data-based print jobs which are stored in the RAM 11C and which incorporate therein a user ID identical with the user ID corresponding to the authentication information, is left for a time not longer than a second given length of time after being stored into the RAM 11C. The second given length of time is a short time such as 2-3 minutes.

In a case that a time difference between a point of time at which at least one of them is stored into the RAM 11C and the current time is not larger than the second length of time, namely, in a case that there is at least one identifiable-data-based print job that is left for the second given length of time or less (S505: Yes), it is regarded that the user immediately needs the printed object printed based on the identifiable-data-based print job, so that the control flow goes to S506. In a case that there is no identifiable-data-based print job left for the second given length of time or less (S505: No), the control flow goes to S507.

In S506, the CPU 11A starts the identifiable-data-based print/unidentifiable-data-based print processing as another task.

In S507, the CPU11A executes a stored print processing in which identifiable-data-based print/unidentifiable-data-based print processing is executed after execution of the other processing. The stored print processing will be described later.

(4) Stored Print Processing

Referring next to FIG. 10, there will be described the stored print processing that is to be executed at S507.

In S601, the CPU 11A waits in standby for a given length of time. In the above-described first embodiment, in a case that at least one of the identifiable-data-based printing and unidentifiable-data-based printing is determined to be executed, when a user logins to the compound machine 2, the identifiable-data-based print job of the login user or the unidentifiable-data-based print job is executed, without the above-described menu screen being displayed, as long as the identifiable-data-based print job of the login user or the unidentifiable-data-based print job is stored. On the other hand, in the second embodiment, in a case that an affirmative judgment is obtained at S503 or S504, or a negative judgment is obtained in at S505 (S503: Yes, S504: Yes or S505: No), when a user logins to the compound machine 2, the CPU 11A causes the display device to display the above-described menu screen, without starting execution of the print job stored in the RAM 11C, even if the identifiable-data-based print job of the login user or the unidentifiable-data-based print job is stored. Then, the compound machine 2 waits for the user to select the other processing for performing the image reading function, FAX function, copying function or direct printing function, through the menu screen.

In S602, the CPU 11A judges whether the other processing has been executed or not. In a case that the other processing has been executed (S602: Yes), the control goes to S603. In a case that it has not been executed (S602: No), the control goes to S606.

In S603, the CPU 11A causes the display device to display a selection screen for receiving a selection of executing the print job stored in the RAM 11C or a selection of not executing the stored pint job, and then receives one of the selections. S603 is an example of a selection receive processing.

In S604, the CPU 11A judges whether or not the selection of executing the print job was received from the user in S603. In a case that the selection of executing the print job was received (S604: Yes), the control flow goes to S605. In a case that the selection of not executing the print job was received (S604: No), the control flow goes back to S602 so as to repeat the processing. In S604, the selection may be received only with respect to whether the unidentifiable-data-based print job is to be executed or not, without receiving the selection as to whether the identifiable-data-based print job is to be executed or not, so that the control flow goes to S605 as long as the selection of executing the unidentifiable-data-based print job is received.

In S605, the CPU 11A starts the identifiable-data-based print/unidentifiable-data-based print processing as another task.

In S606, the CPU 11A judges whether a given length of time has elapsed since the authentication had been successfully done or since the execution of the other processing executed the most recently had been completed. In a case that the given length of time has elapsed (S606: Yes), the control flow goes to S605. In a case that the given length of time has not elapsed (S606: No), the control flow goes to S607.

In S607, the CPU 11A judges whether the logoff has been made, namely, whether the successfully authenticated state has been cancelled. In a case that the successfully authenticated state has been cancelled (S607: Yes), this processing ends and the control flow goes back to the priority determination processing. In a case that the successfully authenticated state has not been cancelled (S607: No), the control flow goes back to S602.

(5) Effects in the Embodiment

In the compound machine 2 constructed as described above, in a case that there is a possibility that the printing portion 13 is to be used for the other processing, the identifiable-data-based print/unidentifiable-data-based print processing is placed on standby, so that the user who wants the other processing to be executed can cause the other processing to be executed before execution of the identifiable-data-based print/unidentifiable-data-based print processing.

Further, in the compound machine 2 according to the second embodiment, in a case that a given length of time has elapsed, without the other processing being executed, since it had been determined that there was a possibility that the printing portion 13 would be used for the other processing (S606: Yes), the identifiable-data-based print/unidentifiable-data-based print processing is executed. If a long time elapses without the other processing being not executed, the identifiable-data-based print/unidentifiable-data-based print processing would be placed on standby for the long time. In the compound machine 2 according to the second embodiment, since the identifiable-data-based print/unidentifiable-data-based print processing is executed in a case that the other processing is not executed within a given length of time, it is possible to keep the standby time within the given length of time.

Further, in the compound machine 2 according to the second embodiment, in a case that the free space of the RAM 11C is equal to the second threshold value or less (S501: Yes), the identifiable-data-based print/unidentifiable-data-based print processing is executed (S506) without executing the judge processing (S503, S504). Thus, it is possible to increase the free space of the RAM 11C at an earlier point of time as compared with an arrangement in which the identifiable-data-based print/unidentifiable-data-based print processing is executed always after execution of the other processing.

Further, in the compound machine 2 according to the second embodiment, in a case that the user does not immediately need a printed object to be printed based on the stored print job, the user can make the selection of not executing the print job at S603, for thereby making it possible to not perform printing based on the stored print job.

Third Embodiment

Figure 11:
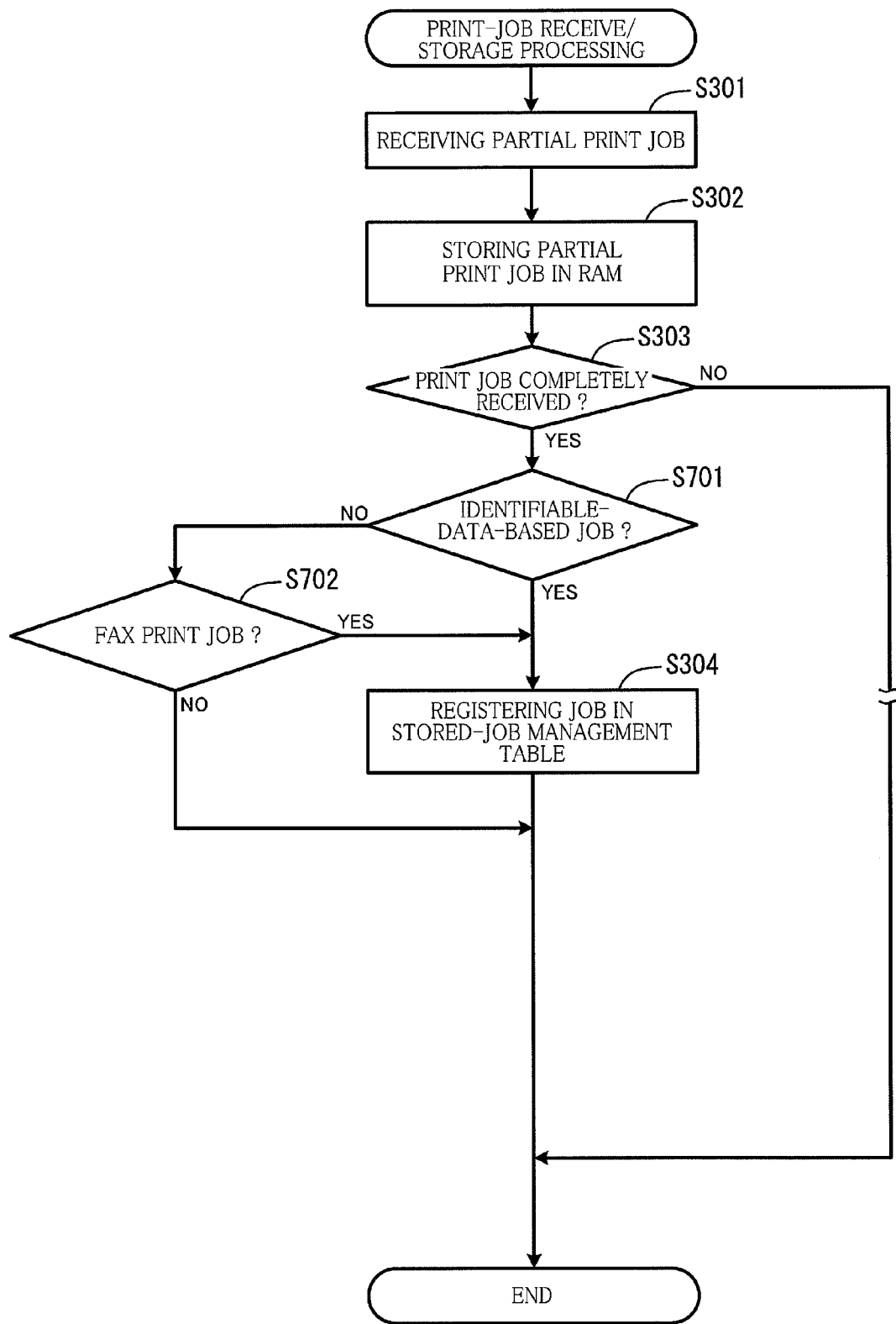
FIG. 11 is a flow chart showing a print-job receive/storage processing according to a third embodiment of the invention.

Referring next to FIG. 11, there will be described a third embodiment of the invention.

In the above-described first embodiment, in a case that the determination of executing the unidentifiable-data-based printing is received, the received unidentifiable-data-based print job is stored in the RAM 11C in the print-job receive/storage processing, irrespective of whether the received unidentifiable-data-based print job is the FAX print job or mobile print job. On the other hand, in the present third embodiment, among the unidentifiable-data-based print jobs, only the FAX print job is stored while the mobile print job is not stored.

Referring to FIG. 11, there will be described the print-job receive/storage processing in this third embodiment. In the following description of the third embodiment, the same reference signs as used in the description of the first embodiment are used to identify substantially the same steps as in the print-job receive/storage processing according to the first embodiment, and the same steps will not be described to avoid redundancy of the description. In FIG. 11, S305-S311 of the print-job receive/storage processing, which are identical with those in the first embodiment, are not illustrated.

In the print-job receive/storage processing according to this third embodiment, S701 and S702 are implemented in addition to those implemented also in the print-job receive/storage processing according to the first embodiment.

In S701, the CPU 11A determines whether the received print job is the identifiable-data-based print job or the unidentifiable-data-based print job. In a case that it is the identifiable-data-based print job (S701: Yes), the control flow goes to S304. In a case that it is the unidentifiable-data-based print job (S701: No), the control flow goes to S702.

In S702, the CPU 11A judges whether the received unidentifiable-data-based print job is the FAX print job or not. In a case that it is the FAX print job (S702: Yes), the control flow goes to S304. In a case that it is not the FAX print job (S702: No), the received print job is deleted and the present processing ends. In the case that it is not the FAX print job, the print job may be immediately executed without it being deleted.

In a case that CPU 11A judges that the reception of a single print job has not been completed (S303: No), the control flow goes to S305 shown in FIG. 7. In a case that CPU 11A judges in S305 that the free space of the RAM 11C is equal or smaller than the first threshold value (S305: Yes), the control flow goes to S306 in which the CPU 11A register the print job that is being currently received, in the stored-job management table 32. However, in this case, too, if the currently received print job is a print job that is other than the identifiable-data-based print job and FAX print job, the processing ends without the currently received print job being registered in the stored-job management table 32.

Further, as described above, in the third embodiment, the unidentifiable-data-based print job other than the FAX print job is not stored in the RAM 11C, so that the judgment made at S403 shown in FIG. 8 is not required in the storage determination processing according to the third embodiment. Thus, the control flow always goes to S404 in which the FAX print job is executed.

In the compound machine 2 as described above, it is possible to cause the print job other than the FAX print job, not to be stored in the RAM 11C.

Other Embodiments

While the embodiments of the present invention have been described with reference to the drawings, it is to be understood that the invention is not limited to the details of the above-described embodiments, but encompasses also the following embodiments by way of example.

(1) In the above-described embodiments, there has been described an example in which there are a FAX print job and a mobile print job as the unidentifiable-data-based print job. However, the unidentifiable-data-based print job is not limited to the FAX print job and mobile print job, but may be any other print job as long as it is a print job by which the user is unidentifiable.

(2) In the above-described embodiments, there has been described an example in which the unidentifiable-data-based print job is the unidentifiable data by which the user is unidentifiable. However, the unidentifiable data is not limited to the unidentifiable-data-based print job. For example, in a case that a print job incorporating therein the user ID cannot be analyzed by the compound machine 2 so that the user ID cannot be obtained, such a print job is unidentifiable data by which the user is unidentifiable.

Further, in the above-described embodiments, there has been described an example in which the PC print job is the identifiable data by which the user is identifiable. However, the identifiable data is not limited to the PC print job. For example, it is possible for the compound machine 2 to receive print data through an electronic mail and to prepare a print job for printing base on the received print data. In this case, a source address of the electric mail may be incorporated as a user ID into the print job.

(3) In the above-described embodiments, there has been described an example in which the authentication is done by the authentication server 3. However, the user management table 31 may be memorized in the compound machine 2, so that the authentication can be done by the compound machine 2 itself.

(4) In the above-described embodiments, there has been described an example in which the storage device is constituted by the RAM 11C. However, the storage device is not limited to the RAM 11C but may be, for example, a flash memory or a hard disk.

Further, the storage device may be constituted by an external device which is communicably connected to the compound machine 2. In this case, the stored-job management table 32 may be memorized in the external device so that the external device can register the print job into the stored-job management table 32. In this case, the storage processing can be executed by the external device.

(5) In the above-described embodiments, there has been described an example in which the print order determination is received from the user. However, printing may be performed always with a fixed print order without receiving the print order determination from the user.

For example, there is also a case where the user inputs the authentication information for the purpose of executing the identifiable-data-based print job. Therefore, in an arrangement in which the identifiable-data-based print job and the unidentifiable-data-based print job are executed in this order of description, it is possible to earlier obtain the printed object printed based on the identifiable-data-based print job, in the case where user inputs the authentication information for the purpose of executing the identifiable-data-based print job.

Further, in an arrangement in which the unidentifiable-data-based print job and the identifiable-data-based print job are executed in this order of description, in the case where user inputs the authentication information for the purpose of executing the identifiable-data-based print job, the authentic user is likely to be present close to the printer also when the unidentifiable-data-based print job is executed. Thus, it is possible to improve security of the printed document printed based on the unidentifiable data.

(6) In the above-described embodiments, there has been described an example in which, in the storage determination processing, the FAX print job is executed while the other unidentifiable-data-based print job other than the FAX print job is deleted without it being executed. However, it is also possible to employ an arrangement in which, in a case that the determination of not storing the unidentifiable-data-based print job is received, the FAX print job is also deleted without it being executed, or the unidentifiable-data-based print job other than the FAX print job is also executed.

(7) In the above-described embodiments, there has been described an example in which, in the storage determination processing, the FAX print job is executed while the other unidentifiable-data-based print job other than the FAX print job is deleted without it being executed. However, it is also possible to employ an arrangement that includes a step of receiving, from the user, a selection of executing the unidentifiable-data-based print job selected in S402 or a selection of deleting the unidentifiable-data-based print job selected in S402, so that the unidentifiable-data-based print job is executed in case of reception of the selection of the execution, and the unidentifiable-data-based print job is deleted in case of reception of the selection of the deletion.

(8) In the above-described embodiments, there has been described an example in which the currently received unidentifiable-data-based print job is also executed in a case that the free space of the RAM 11C is equal to or smaller than the first threshold value (S305: Yes). However, it is also possible to employ an arrangement in which the currently received unidentifiable-data-based print job, i.e., the unidentifiable-data-based print job that is completely stored into the RAM 11C after the authentication is successfully done, is not executed irrespective of amount of the free space of the RAM 11C. In this arrangement, it is possible to reduce a risk that the user could be confused by unexpected print execution.

(9) In the above-described embodiments, there has been described an example in which the authentication information is constituted by the combination of the user ID and password or the card ID. However, the authentication information is not limited to these information, but may be constituted by bio-information such as finger mark or other kind of information.

(10) In the above-described embodiments, there has been described an example in which the printer is constituted by the compound machine (i.e. multi-function device) 2. However, the printer may be constituted by a single-function printer.

(11) In the above-described embodiments, there has been described an example in which each of the processings is executed by the CPU 11A. However, a part of the processings may be executed by the ASIC 11D. Further, the controlling portion 11 does not necessarily have to include the ASIC 11D. Further, the controlling portion 11 may include a plurality of CPUs so that and each of the processings can be executed by a assigned one of the CPUs.

What is claimed is:

1. A printer comprising:
a receiver configured to receive an authentication information inputted thereto;
a printing portion;
a processor configured to communicate with a storage device; and
a memory storing instructions that, when executed by the processor, causes the printer to:
authenticate a login user by using the authentication information received by the receiver;
determine whether the login user is successfully authenticated;
determine whether a user identity information is included in a print data stored in the memory storage device when it is determined that the login user is successfully authenticated;
determine that the print data is an identifiable data when it is determined that the user identity information is included in the print data, and determine that the print data is an unidentifiable data when it is determined that the user identity information is not included in the print data;
determine whether the login user is identical with a user having sent the print data, by using the authentication information and the user identity information, when it is determined that the print data is the identifiable data;
control the printing portion to print the print data determined as the identifiable data in response to determining that the login user is identical with the user having sent the print data, and control the printing portion not to print the print data determined as the identifiable data when it is determined that the login user is not identical with the user having sent the print data; and
control the printing portion to automatically print, without any operation by the login user, the print data determined as the unidentifiable data in response to determining that the login user is successfully authenticated, irrespective of whether the login user is identical with the user having sent the print data; and
cause the printing portion to print the unidentifiable data which has been completely stored in the storage device before the login user is successfully authenticated, without causing the printing portion to print the unidentifiable data which has been completely stored in the storage device after the login user is successfully authenticated.

2. The printer according to claim 1,
wherein the instructions stored in the memory further cause the printer to:
cause the printing portion to print the identifiable data prior to printing the unidentifiable data, in a case where both the unidentifiable data and the identifiable data are stored in the storage device.

3. The printer according to claim 1,
wherein the instructions stored in the memory further cause the printer to:
cause the printing portion to print the unidentifiable data prior to printing the identifiable data, in a case where both the unidentifiable data and the identifiable data are stored in the storage device.

4. The printer according to claim 1,
wherein the receiver is further configured to receive a set command to cause a setting to be input thereto, the setting indicating to hold the unidentifiable data in the storage device without printing the unidentifiable data until the login user is successfully authenticated, and
wherein the instructions stored in the memory further cause the printer to:
when the setting command is received by the receiver,
hold the unidentifiable data in the storage device without causing the printing portion to print the unidentifiable data until the login user is successfully authenticated.

5. The printer according to claim 4,
wherein the receiver is further configured to receive a cancel command to cancel the setting,
wherein the instructions stored in the memory further cause the printer to:
when the cancel command is received by the receiver,
delete the unidentifiable data which is received before the cancel command is received from the storage device, without causing the printing portion to print the unidentifiable data which is received before the cancel command is received.

6. The printer according to claim 4,
wherein the receiver is further configured to receive a cancel command to cancel the setting,
wherein the printer further comprising a job receiver, and
wherein the instructions stored in the memory further cause the printing portion to:
when the cancel command is received by the receiver,
print the unidentifiable data immediately after the unidentifiable data is received by the job receiver.

7. The printer according to claim 4,
wherein the receiver is further configured to receive a cancel command to cancel the setting,
wherein the instructions stored in the memory further cause the printing portion to:
when the cancel command is received by the receiver,
immediately print the unidentifiable data which is received before the cancel command is received.

8. The printer according to claim 4,
wherein the receiver is further configured to receive a cancel command to cancel the setting,
wherein the instructions stored in the memory further cause the printer to:
when the cancel command is received by the receiver,
cause the printing portion to print a particular unidentifiable data stored in the storage device, and
delete other unidentifiable data stored in the storage device, without causing the printing portion to print the other unidentifiable data.

9. The printer according to claim 8, wherein the particular unidentifiable data is facsimile data.

10. The printer according to claim 1,
wherein the instructions stored in the memory further cause the printer to:
store a particular unidentifiable data in the storage device, without storing other unidentifiable data in the storage device.

11. The printer according to claim 10, wherein the particular unidentifiable data is facsimile data.

12. The printer according to claim 1,
wherein the instructions stored in the memory further cause the printer to:
cause the printing portion to continue printing the unidentifiable data, even if the successfully authenticated state is cancelled during printing of the unidentifiable data.

13. The printer according to claim 1,
wherein the receiver is further configured to receive a set command to cause a setting to be input thereto, the setting indicating to cause the printing portion to not print the unidentifiable data, and wherein the instructions stored in the memory further cause the printer to:

when the setting command is received by the receiver, cause the printing portion to not print the unidentifiable data.

14. The printer according to claim 1, wherein the instructions stored in the memory further cause the printer to:

cause the printing portion to print the unidentifiable data which has been completely stored in the storage device before the login user is successfully authenticated, without causing the printing portion to print the unidentifiable data which has been completely stored in the storage device after the login user is successfully authenticated.

15. The printer according to claim 1, wherein, when the completely stored unidentifiable data is facsimile data, the instructions stored in the memory cause the printer to cause the printing portion to print the facsimile data whereas the instructions stored in the memory cause the printer to cause the printing portion not to print different data that is different from the facsimile data when the completely stored unidentifiable data is the different data.

16. A printer comprising:

a receiver configured to receive an authentication information inputted thereto;

a printing portion;

a processor configured to communicate with a storage device; and a memory storing instructions that, when executed by the processor, causes the printer to:

authenticate a login user by using the authentication information received by the receiver; and determine whether the login user is successfully authenticated, wherein, when the login user is successfully authenticated, the instructions stored in the memory cause the printer to determine whether a user identity information is included in a print data, wherein, when the user identity information is included in the print data, the instructions stored in the memory cause the printer to determine whether the login user is identical with a user having sent the print data, by using the authentication information and the user identity information, wherein, when the login user is identical with the user having sent the print data, the print data is regarded as an identifiable data, and the instructions stored in the memory cause the printing portion to print the print data regarded as the identifiable data, wherein, when the login user is not identical with the user having sent the print data, the instructions stored in the memory cause the printing portion to not print the print data, wherein, when the user identity information is not included in the print data, the print data is regarded as an unidentifiable data, and the instructions stored in the memory cause the printing portion to print the print data regarded as the unidentifiable data, irrespective of whether the login user is identical with the user having sent the print data, and wherein the instructions stored in the memory further cause the printer to:

cause the printing portion to print the unidentifiable data which has been completely stored in the storage device before the login user is successfully authenticated, without causing the printing portion to print the unidentifiable data which has been completely stored in the storage device after the login user is successfully authenticated.

17. A printer comprising:

a receiver configured to receive an authentication information inputted thereto;

a printing portion;

a processor configured to communicate with a storage device; and a memory storing instructions that, when executed by the processor, causes the printer to:

authenticate a login user by using the authentication information received by the receiver; and determine whether the login user is successfully authenticated, wherein, when the login user is successfully authenticated, the instructions stored in the memory cause the printer to determine whether a user identity information is included in a print data, wherein, when the user identity information is included in the print data, the instructions stored in the memory cause the printer to determine whether the login user is identical with a user having sent the print data, by using the authentication information and the user identity information, wherein, when the login user is identical with the user having sent the print data, the print data is regarded as an identifiable data, and the instructions stored in the memory cause the printing portion to print the print data regarded as the identifiable data, wherein, when the login user is not identical with the user having sent the print data, the instructions stored in the memory cause the printing portion to not print the print data, wherein, when the user identity information is not included in the print data, the print data is regarded as an unidentifiable data, and the instructions stored in the memory cause the printing portion to print the print data regarded as the unidentifiable data, irrespective of whether the login user is identical with the user having sent the print data, and wherein the instructions stored in the memory further cause the printer to:

cause the printing portion to print the unidentifiable data which has been completely stored in the device before the login user is successfully authenticated, and cause the printing portion to print the unidentifiable data which has been completely stored in the storage device after the login user is successfully authenticated, in a case where a free space of the storage device is not larger than a first threshold value.

18. A printer comprising:

a receiver configured to receive an authentication information inputted thereto;

a printing portion;

a processor configured to communicate with a storage device; and a memory storing instructions that, when executed by the processor, causes the printer to:

authenticate a login user by using the authentication information received by the receiver;

determine whether the login user is successfully authenticated;

determine whether a user identity information is included in a print data stored in the memory when it is determined that the login user is successfully authenticated;

determine that the print data is an identifiable data when it is determined that the user identity information is included in the print data, and determine that the print data is an unidentifiable data when it is determined that the user identity information is not included in the print data;

determine whether the login user is identical with a user having sent the print data, by using the authentication information and the user identity information, when it is determined that the print data is the identifiable data;

control the printing portion to print the print data determined as the identifiable data in response to determining that the login user is identical with the user having sent the print data, and control the printing portion not to print the print data determined as the identifiable data when it is determined that the login user is not identical with the user having sent the print data;

control the printing portion to print the print data determined as the unidentifiable data in response to determine that the login user is successfully authenticated, irrespective of whether the login user is identical with the user having sent the print data;

cause the printing portion to print the unidentifiable data which has been completely stored in the storage device before the login user is successfully authenticated, and cause the printing portion to print the unidentifiable data which has been completely stored in the storage device after the login user is successfully authenticated, in a case where a free space of the storage device is not larger than a first threshold value.

19. A printer comprising:
a receiver configured to receive an authentication information inputted thereto;
a printing portion;
a processor configured to communicate with a storage device; and
a memory storing instructions that, when executed by the processor, causes the printer to:
authenticate a login user by using the authentication information received by the receiver;
determine whether the login user is successfully authenticated;
determine whether a user identity information is included in a print data stored in the memory when it is determined that the login user is successfully authenticated;
determine that the print data is an identifiable data when it is determined that the user identity information is included in the print data, and determine that the print data is an unidentifiable data when it is determined that the user identity information is not included in the print data;
determine whether the login user is identical with a user having sent the print data, by using the authentication information and the user identity information, when it is determined that the print data is the identifiable data;
control the printing portion to print the print data determined as the identifiable data in response to determining that the login user is identical with the user having sent the print data, and control the printing portion not to print the print data determined as the identifiable data when it is determined that the login user is not identical with the user having sent the print data;

control the printing portion to print the print data determined as the unidentifiable data in response to determine that the login user is successfully authenticated, irrespective of whether the login user is identical with the user having sent the print data;

judge whether there is a possibility that the printing portion is to be used for another processing other than a data-based print processing of causing the printing portion to print the print data based on data stored in the storage device, in a case of satisfaction of a condition that the login user has been successfully authenticated, and place the data-based print processing on standby, in a case where it is judged that there is the possibility that the printing portion is to be used for the another processing, and wherein it is determined that there is the possibility when (i) original document is set on ADF or platen glass of the printer, (ii) USB memory is attached to a USB host interface of the printer and/or (iii) a given length of time elapsed after the print data determined as the identifiable data is stored in the memory.

20. A printer comprising:
a receiver configured to receive an authentication information inputted thereto;
a printing portion;
a processor configured to communicate with a storage device; and
a memory storing instructions that, when executed by the processor, causes the printer to:
authenticate a login user by using the authentication information received by the receiver;
determine whether the login user is successfully authenticated;
determine whether a user identity information is included in a print data stored in the memory when it is determined that the login user is successfully authenticated;
determine that the print data is an identifiable data when it is determined that the user identity information is included in the print data, and determine that the print data is an unidentifiable data when it is determined that the user identity information is not included in the print data;
determine whether the login user is identical with a user having sent the print data, by using the authentication information and the user identity information, when it is determined that the print data is the identifiable data;
control the printing portion to print the print data determined as the identifiable data in response to determining that the login user is identical with the user having sent the print data,
and control the printing portion not to print the print data determined as the identifiable data when it is determined that the login user is not identical with the user having sent the print data;
control the printing portion to print the print data determined as the unidentifiable data in response to determine that the login user is successfully authenticated, irrespective of whether the login user is identical with the user having sent the print data;
judge whether there is a possibility that the printing portion is to be used for another processing other than a data-based print processing of causing the printing portion to print the print data based on data stored in the storage device, in a case of satisfaction of a condition that the login user has been successfully authenticated, and place the data-based print processing on standby, in a case where it is judged that there is the possibility that the printing portion is to be used for the another processing, and wherein it is determined that there is the possibility when (i) original document is set on ADF or platen glass of the printer, (ii) USB memory is attached to a USB host interface of the printer and/or (iii) a given length of time elapsed after the print data determined as the identifiable data is stored in the memory; and execute the data-based print processing by causing the printing portion to print the print data based on the data stored in the storage device, in a case where the another processing is not executed within a given length of time after it is judged that there is the possibility that the printing portion is to be used for the another processing.

21. A printer comprising:
a receiver configured to receive an authentication information inputted thereto;
a printing portion;
a processor configured to communicate with a storage device; and
a memory storing instructions that, when executed by the processor, causes the printer to: authenticate a login user by using the authentication information received by the receiver;
determine whether the login user is successfully authenticated;
determine whether a user identity information is included in a print data stored in the memory when it is determined that the login user is successfully authenticated;
determine that the print data is an identifiable data when it is determined that the user identity information is included in the print data, and determine that the print data is an unidentifiable data when it is determined that the user identity information is not included in the print data;
determine whether the login user is identical with a user having sent the print data, by using the authentication information and the user identity information, when it is determined that the print data is the identifiable data;
control the printing portion to print the print data determined as the identifiable data in response to determining that the login user is identical with the user having sent the print data,
and control the printing portion not to print the print data determined as the identifiable data when it is determined that the login user is not identical with the user having sent the print data;
control the printing portion to print the print data determined as the unidentifiable data in response to determine that the login user is successfully authenticated, irrespective of whether the login user is identical with the user having sent the print data;
judge whether there is a possibility that the printing portion is to be used for another processing other than a data-based print processing of causing the printing portion to print the print data based on data stored in the storage device, in a case of satisfaction of a condition that the login user has been successfully authenticated, and
place the data-based print processing on standby, in a case where it is judged that there is the possibility that the printing portion is to be used for the another processing, and
wherein it is determined that there is the possibility when (i) original document is set on ADF or platen glass of the printer, (ii) USB memory is attached to a USB host interface of the printer and/or (iii) a given length of time elapsed after the print data determined as the identifiable data is stored in the memory; and
execute the data-based print processing by causing the printing portion to print the print data based on the data stored in the storage device, without judging whether there is the possibility that the printing portion is to be used for the another processing, in a case where a free space of the storage device is not larger than a second threshold value.

* * * * *

UNITED STATES PATENT AND TRADEMARK OFFICE
CERTIFICATE OF CORRECTION

PATENT NO. : 9,928,014 B2  
APPLICATION NO. : 14/484768  
DATED : March 27, 2018  
INVENTOR(S) : Takashi Ohmiya et al.

Page 1 of 1

It is certified that error appears in the above-identified patent and that said Letters Patent is hereby corrected as shown below:

On the Title Page

Item [57], should read:
A printer includes a memory storing instructions for authenticating a login user and determining whether a user identity information is included in a print data. When the user identity information is included in the print data, the instructions cause the printer to determine whether the login user is identical with a data sender user having sent the print data. When the login user is identical with the data sender user, the instructions cause the printer to print the print data. When the login user is not identical with the data sender user, the instructions cause the printing portion to not print the print data. When the user identity information is not included in the print data, the instructions cause the printer to print the print data irrespective of whether the login user is identical with the data sender user.

In the Claims

Claim 1:
Column 23, Line 17: Delete "the memory storage device" and insert -- the storage device -- therefor.
Column 23, Line 39: After "unidentified data" insert -- which has been completely stored in the storage device before the login user is successfully authenticated, --.
Column 23, Lines 42-49: Delete "the user having sent the print data; and cause the printing portion to print the unidentifiable data which has been completely stored in the storage device before the login user is successfully authenticated, without causing the printing portion to print the unidentifiable data which has been completely stored in the storage device after the login user is successfully authenticated." and insert -- the user having sent the print data. -- therefor.

Claim 20:
Column 29, Line 2: Delete "where it is judged" and insert -- when it is judged -- therefor.
Column 29, Line 5: Delete "wherein it is determined" and insert -- when it is determined -- therefor.

Signed and Sealed this  
Seventeenth Day of July, 2018

Andrei Iancu  
*Director of the United States Patent and Trademark Office*